(12) United States Patent
Lim et al.

(10) Patent No.: US 7,567,709 B2
(45) Date of Patent: Jul. 28, 2009

(54) SEGMENTATION, INCLUDING CLASSIFICATION AND BINARIZATION OF CHARACTER REGIONS

(75) Inventors: Chae-Whan Lim, Taegukwangyok-shi (KR); Nam-Chul Kim, Taegukwangyok-shi (KR); Ick-Hoon Jang, Kumi-shi (KR); Ki-Taeg Shin, Taegukwangyok-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 883 days.

(21) Appl. No.: 10/767,061

(22) Filed: Jan. 30, 2004

(65) Prior Publication Data

US 2005/0008250 A1    Jan. 13, 2005

(30) Foreign Application Priority Data

Jan. 30, 2003    (KR) .................. 10-2003-0006420

(51) Int. Cl.
  *G06K 9/34* (2006.01)
  *G06K 9/40* (2006.01)
(52) U.S. Cl. ...................... 382/176; 382/266
(58) Field of Classification Search ........... 382/176, 382/195, 254, 266; 358/462, 464
  See application file for complete search history.

(56) References Cited

U.S. PATENT DOCUMENTS 5,212,741 A * 5/1993 Barski et al. ............. 382/156
5,535,013 A * 7/1996 Murata .................... 382/239
6,195,459 B1 * 2/2001 Zhu ........................ 382/176

FOREIGN PATENT DOCUMENTS

EP    1 117 072 A1    7/2001
JP    2001-291058     10/2001

OTHER PUBLICATIONS

Osamu Nakamura et al., "Extraction Of Photographic Area From Document Images", Electronics and Communications in Japan, Jun. 1988, pp. 76-85, Part 1, vol. 71, No. 6, Wiley, Hoboken N J, U.S.A.*

(Continued)

*Primary Examiner*—John B Strege
(74) *Attorney, Agent, or Firm*—Roylance, Abrams, Berdo and Goodman, LLP

(57) ABSTRACT

Disclosed is a device for binarizing an image. The device comprises an input part for receiving an image, a block classification part for dividing the received image into blocks, and classifying the divided blocks into character blocks and background blocks, an edge enhancement part for enhancing edges of a character block using relations between neighboring pixels in the character block classified by the block classification part, and generating a threshold for distinguishing character pixels and background pixels of the character block, and a binarization part for binarizing pixels of character blocks output from the edge enhancement part into a first brightness value for character pixels and a second brightness value for background pixels by comparing the pixels of the character blocks with the threshold, and binarizing pixels of background blocks output from the block classification part into the second brightness value.

20 Claims, 27 Drawing Sheets

OTHER PUBLICATIONS

Shan Mo et al., "Adaptive, Quadratic Preprocessing Of Document Images For Binarization", IEEE Transactions on Image Processing, Jul. 1998, pp. 992-999, vol. 7 No. 7, IEEE Service Center, Piscataway N J, U.S.A.*

Ricardo L. De Queiroz et al., "Fast Segmentation Of The JPEG Compressed Documents", Journal of Electronic Imaging, Apr. 1998, pp. 367-377, vol. 7, No. 2, SPIE, U.S.A.*

Shan Mo et al., "Adaptive, Quadratic Preprocessing Of Document Images For Binarization", IEEE Transactions on Image Processing, Jul. 1998, pp. 992-999, vol. 7, No. 7, IEEE Service Center, Piscataway NJ, U.S.A.

Ricardo L. De Queiroz et al., "Fast Segmentation Of The JPEG Compressed Documents", Journal of Electronic Imaging, Apr. 1998, pp. 367-377, vol. 7, No. 2, SPIE, U.S.A.

Hei Tao Fung et al., "Segmentation Of Scanned Documents For Efficient Compression", Proceedings of the SPIE, Mar. 17, 1996, pp. 701-712, vol. 2727, SPIE, Bellingham VA, U.S.A.

Giovanni Ramponi et al., "Enhancing Document Images With A Quadratic Filter", Signal Processing, Jul. 1, 1993, pp. 23-34, vol. 33, No. 1, Elsevier Science Publishers B.V., Amsterdam, NL.

G. Ramponi, "A Noise-Smoothing Nonlinear Operator For The Preprocessing Of Text And Graphic Images", Image Processing And Its Applications, 1992, pp. 242-245, International Conference on Maastricht, London, UK.

Osamu Nakamura et al., "Extraction Of Photographic Area From Document Images", Electronics and Communications in Japan, Jun. 1988, pp. 76-85, Part 1, vol. 71, No. 6, Wiley, Hoboken NJ, U.S.A.

* cited by examiner

FIG.7C

SEGMENTATION, INCLUDING CLASSIFICATION AND BINARIZATION OF CHARACTER REGIONS

PRIORITY

This application claims priority under 35 U.S.C. § 119 to an application entitled "Device and Method for Binarizing Image" filed in the Korean Intellectual Property Office on Jan. 30, 2003 and assigned Serial No. 2003-6420, the contents of which are incorporated herein by reference.

BACKGROUND OF THE INVENTION

1. Field of the Invention

The present invention relates generally to a device and method for binarizing an image, and in particular, to a device and method for preprocessing an input image into a binary signal before recognizing characters in the input image.

2. Description of the Related Art

Generally, a preprocessing operation is performed to recognize image characters. "Preprocessing operation" refers to an operation of processing an image before recognition of characters in the image. The image preprocessing operation can include an operation of deciding whether or not an input image is appropriate for character recognition, an operation of correcting a skew of an object in an input image, an operation of properly correcting a size of an input image, and an operation of binarizing an input image so that characters in the input image can be recognized.

FIG. 1 is a block diagram illustrating the structure of a conventional binarization device for binarizing an image. The binarization device shown in FIG. 1 uses a quadratic filter. The quadratic filter is disclosed in a reference entitled "A Polynomial Filter for the Preprocessing of Mail Address Images," by P. Fontanot and G. Ramponi et al., Proc. 1993 IEEE Winter Workshop on Nonlinear Digital Signal Processing, Tampere, Finland, January 1993, pp. 2.1-2.6, the contents of which are incorporated herein by reference.

Operation of the quadratic filter will now be described. A first threshold selection part 11 calculates a first threshold Th1 used for classifying pixels of an image into character pixels and background pixels. A mean computation part 13 classifies the pixels of the image into character pixels and background pixels on the basis of the first threshold Th1, and computes their mean values. A normalization part 15 converts pixels of the input image into values close to '1' or '0' using mean values of the character pixels and the background pixels, output from the mean computation part 13. It is assumed herein that the normalization part 15 converts the character pixels into a value close to '1' and the background pixels into a value close to '0'. A quadratic operation part 17 performs the operation of enhancing edges of the normalized pixels using relations between a given central pixel and its neighboring pixels with respect to the respective pixels. A denormalization part 19 performs the operation of denormalizing the edge component-enhanced pixels output from the quadratic operation part 17 in the range of their original pixel values. A second threshold selection part 21 calculates a second threshold Th2 used for classifying the denormalized pixels into character pixels and background pixels.

Simple binarization part 30 converts the pixels output from the denormalization part 19 into two specific brightness values on the basis of the second threshold Th2.

When such binarization is performed on the entire image photographed in an irregularly lighted situation, however, with a shadow thrown thereon, binarization performance deteriorates undesirably.

SUMMARY OF THE INVENTION

It is, therefore, an object of the present invention to provide a device and method for classifying an image into character blocks and background blocks before binarization.

It is another object of the present invention to provide a device and method for classifying an image into character blocks and background blocks, growing the classified character blocks to reclassify the character blocks, before binarization.

It is another object of the present invention to provide a device and method for classifying an image into character blocks and background blocks, grouping the classified character blocks with their neighboring blocks to enhance edge components, and separating the character blocks from the grouped blocks, before binarization.

It is yet another object of the present invention to provide a device and method for classifying an image into character blocks and background blocks, growing the classified character blocks to reclassify the character blocks, grouping the classified character blocks with their neighboring blocks to enhance edge components, and separating the character blocks from the grouped blocks, before binarization.

It is still another object of the present invention to provide a device and method for classifying an image into character blocks and background blocks, enhancing edge components of the character blocks using a quadratic filter, and then binarizing pixels of the character blocks and the background blocks.

It is still another object of the present invention to provide a device and method for classifying an image into character blocks and background blocks, enhancing edge components of the character blocks using an improved quadratic filter, and then binarizing pixels of the character blocks and the background blocks.

In accordance with one aspect of the present invention, there is provided a device for binarizing an image, comprising an input part for receiving an image, a block classification part for dividing the received image into blocks, and classifying the divided blocks into character blocks and background blocks, an edge enhancement part for enhancing edges of a character block using relations between neighboring pixels in the character block classified by the block classification part, and generating a threshold for distinguishing character pixels and background pixels of the character block, and a binarization part for binarizing pixels of character blocks output from the edge enhancement part into a first brightness value for character pixels and a second brightness value for background pixels by comparing the pixels of the character blocks with the threshold, and binarizing pixels of background blocks output from the block classification part into the second brightness value.

In accordance with another aspect of the present invention, there is provided a device for binarizing an image, comprising an input part for receiving an image, a block classification part for dividing the received image into blocks, and classifying the divided blocks into character blocks and background blocks, a block growing part for growing the classified character blocks, and restoring a block containing a character pixel, classified as a background block, to a character block, and an edge enhancement part for enhancing edges of a character block using relations between neighboring pixels in the character block output from the block growing part, and generating a threshold for distinguishing character pixels and background pixels of the character block. The device for binarizing an image further comprises a binarization part for binarizing pixels of character blocks output from the edge enhancement part into a first brightness value for character pixels and a second brightness value for background pixels by comparing the pixels of the character blocks with the threshold, and binarizing pixels of background blocks output from the block growing part into the second brightness value.

In accordance with another aspect of the present invention, there is provided a device for binarizing an image, comprising an input part for receiving an image, a block classification part for dividing the received image into blocks, and classifying the divided blocks into character blocks and background blocks, a block grouping part for grouping a character block classified by the block classification part with its neighboring blocks, thereby generating a grouped block, and an edge enhancement part for enhancing edges of the character block using relations between neighboring pixels in the grouped block, and generating a threshold for distinguishing character pixels and background pixels of the character block. The device for binarizing an image further comprises a block splitting part for separating the character block from the grouped block output from the edge enhancement part, and a binarization part for binarizing pixels of the separated character block into a first brightness value for character pixels and a second brightness value for background pixels by comparing the pixels of the separated character block with the threshold, and binarizing pixels of the background block output from the block classification part into the second brightness value.

In accordance with still another aspect of the present invention, there is provided a device for binarizing an image, comprising an input part for receiving an image, a block classification part for dividing the received image into blocks, and classifying the divided blocks into character blocks and background blocks, a block growing part for growing the classified character block, and restoring a block containing a character pixel, classified as a background block, to a character block, and a block grouping part for grouping a character block output from the block growing part with its neighboring blocks, thereby generating a grouped block. The device for binarizing an image further comprises an edge enhancement part for enhancing edges of the character block using relations between pixels in the grouped block, and generating a threshold for distinguishing character pixels and background pixels of the character block, a block splitting part for separating the character block from the grouped block output from the edge enhancement part, and a binarization part for binarizing pixels of the separated character blocks into a first brightness value for character pixels and a second brightness value for background pixels by comparing the pixels of the separated character blocks with the threshold, and binarizing pixels of a background block output from the block growing part into the second brightness value.

In accordance with still another aspect of the present invention, there is provided a method for binarizing an image, comprising the steps of receiving an image, dividing the received image into blocks, and classifying the divided blocks into character blocks and background blocks, enhancing edges of a character block using relations between neighboring pixels in the character block, and generating a threshold for distinguishing character pixels and background pixels of the character block, and binarizing pixels of the edge-enhanced character blocks into a first brightness value for character pixels and a second brightness value for background pixels by comparing the pixels of the character blocks with the threshold, and binarizing pixels of the classified background blocks into the second brightness value.

In accordance with still another aspect of the present invention, there is provided a method for binarizing an image, comprising the steps of receiving an image, dividing the received image into blocks, and classifying the divided blocks into character blocks and background blocks, growing the classified character blocks, and restoring a block containing a character pixel, classified as a background block, to a character block, enhancing edges of a character block using relations between neighboring pixels in the character block, and generating a threshold for distinguishing character pixels and background pixels of the character block, and binarizing pixels of the edge-enhanced character blocks into a first brightness value for character pixels and a second brightness value for background pixels by comparing the pixels of the character blocks with the threshold, and binarizing pixels of the background blocks into the second brightness value.

In accordance with still another aspect of the present invention, there is provided a method for binarizing an image, comprising the steps of receiving an image, dividing the received image into blocks, and classifying the divided blocks into character blocks and background blocks, grouping the classified character block with its neighboring blocks, thereby generating a grouped block, enhancing edges of the character block using relations between neighboring pixels in the grouped block, and generating a threshold for distinguishing character pixels and background pixels of the character block, and separating the character block from the edge-enhanced grouped block. The method for binarizing an image further comprises binarizing pixels of the separated character block into a first brightness value for character pixels and a second brightness value for background pixels by comparing the pixels of the separated character block with the threshold, and binarizing pixels of the background block into the second brightness value.

In accordance with still another aspect of the present invention, there is provided a method for binarizing an image, comprising the steps of receiving an image, dividing the received image into blocks, and classifying the divided blocks into character blocks and background blocks, growing the classified character block, and restoring a block containing a character pixel, classified as a background block, to a character block, grouping the character block with its neighboring blocks, thereby generating a grouped block, and enhancing edges of the character block using relations between pixels in the grouped block, and generating a threshold for distinguishing character pixels and background pixels of the character block. The method for binarizing an image further comprises separating the character block from the grouped block, and binarizing pixels of the separated character blocks into a first brightness value for character pixels and a second brightness value for background pixels by comparing the pixels of the separated character blocks with the threshold, and binarizing pixels of the background blocks into the second brightness value.

BRIEF DESCRIPTION OF THE DRAWINGS

The above and other objects, features and advantages of the present invention will become more apparent from the following detailed description when taken in conjunction with the accompanying drawings in which:

FIG. 7C is a diagram illustrating the dominant DCT coefficients used in a block classification process;

DETAILED DESCRIPTION OF THE PREFERRED EMBODIMENTS

In the following description, specific details such as a size of an image and sizes of character and background blocks are provided for a better understanding of the present invention. It would be obvious to those skilled in the art that the invention can be easily implemented without such specific details or by modifying the same.

In the embodiments of the present invention, an input image is assumed to have a size of 640×480 pixels. The term "block" refers to character and background blocks, and it is assumed herein that each of the blocks has a size of 8×8 pixels. In addition, the term "grouped block" refers to a block made by grouping a character block to be binarized with its 8 neighboring blocks, and it is assumed herein that the grouped block has a size of 24×24 pixels.

Preferred embodiments of the present invention will now be described in detail with reference to the annexed drawings.

Figure 1:
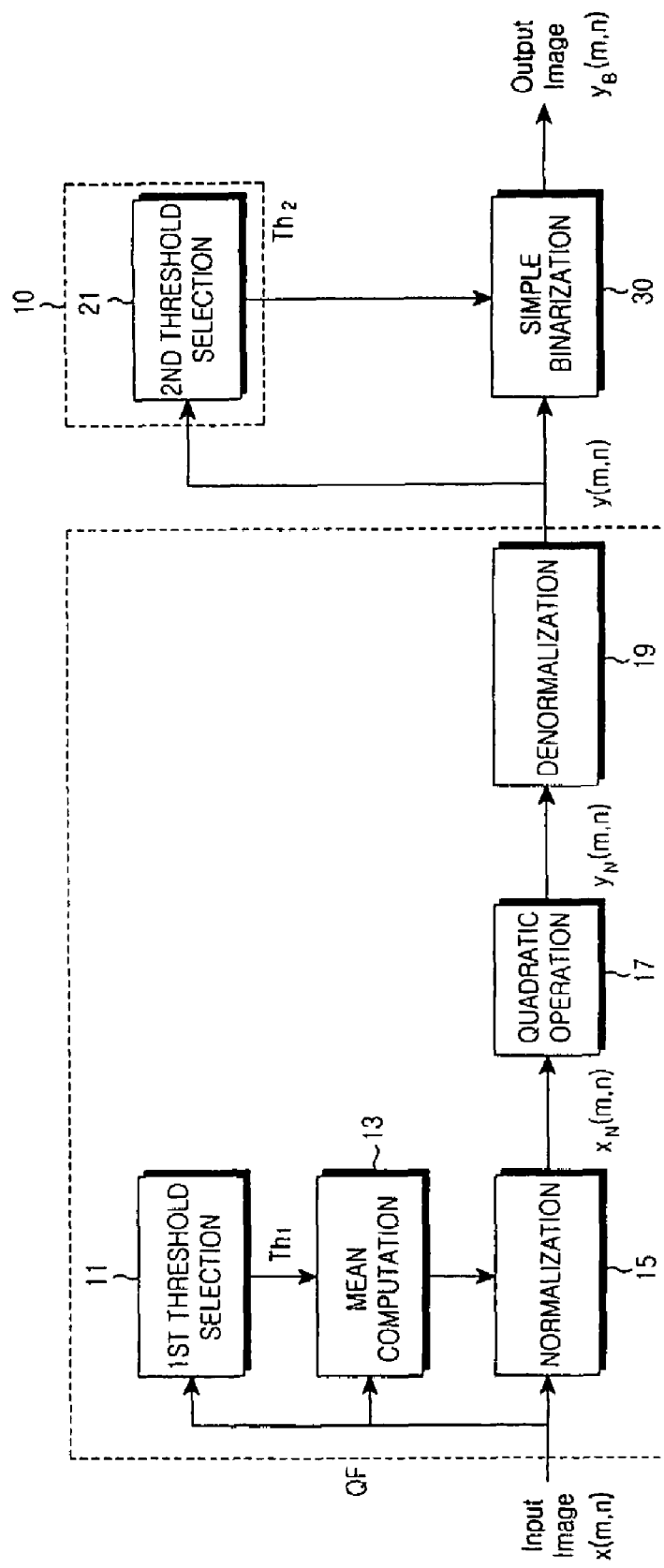
FIG. 1 is a block diagram illustrating a structure of a conventional image binarization device.
Figure 2:
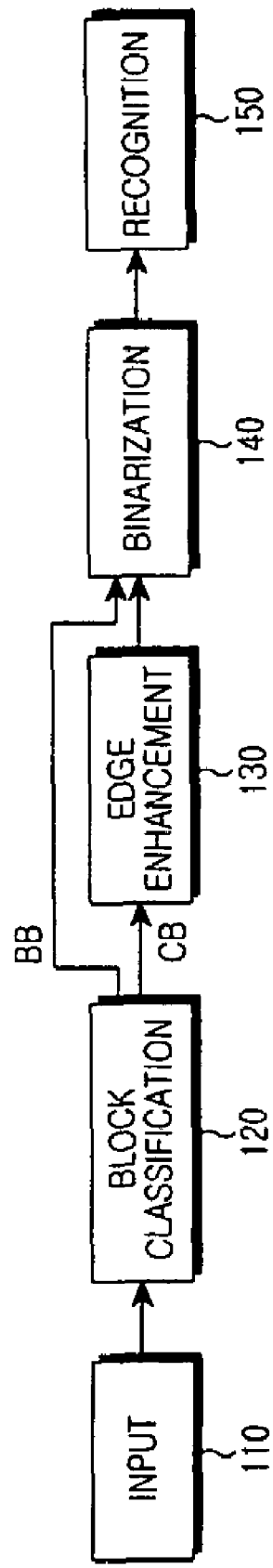
FIG. 2 is a block diagram illustrating a structure of an image binarization device according to a first embodiment of the present invention.

FIG. 2 is a block diagram illustrating a structure of a binarization device according to a first embodiment of the present invention. Referring to FIG. 2, an input part 110 has the function of receiving an input image. A camera, scanner, a communication interface including a modem and a network, and a computer, among other devices, can serve as the input part 110. It is assumed herein the input image is comprised of 640 (column)×480 (row) pixels.

Block classification part 120 divides the input image received from the input part 110 into blocks having a preset block size, and classifies the divided blocks into character blocks and background blocks by analyzing pixels included in the divided blocks. The block classification part 120 classifies the divided blocks into character blocks and background blocks in order to optionally perform binarization on a region where characters are included. It is assumed herein that each of the blocks has a size of 8×8 pixels.

Edge enhancement part 130 enhances edges of the character blocks using relations between character pixels and their neighboring pixels in the character blocks classified by the block classification part 120, and generates pixels in which noise components are reduced. In addition, the edge enhancement part 130 calculates a threshold Th2 used for binarizing the pixels. The edge enhancement part 130 can include a quadratic filter or an improved quadratic filter.

Binarization part 140 compares the pixels of the character blocks output from the edge enhancement part 130 with the threshold Th2, and binarizes character pixels and background pixels into a first brightness value and a second brightness value, respectively. In addition, the binarization part 140 binarizes the pixels of the background pixels output from the block classification part 120 into the second brightness value. The binarization part 140 can include a compressor that compresses the binarized image before the binarized image is sent to a recognition part 150, so that efficiency of storage space can be improved.

Recognition part 150 recognizes the binarized signal output from the binarization part 140.

Figure 3:
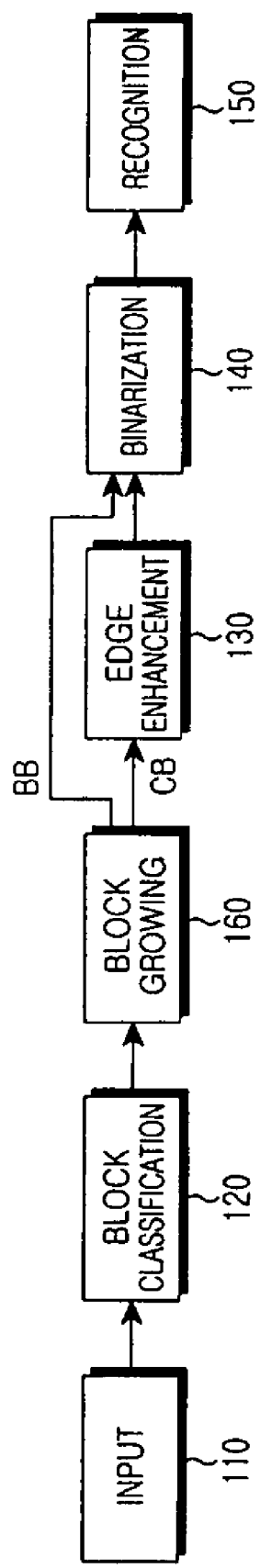
FIG. 3 is a block diagram illustrating a structure of an image binarization device according to a second embodiment of the present invention.

FIG. 3 is a block diagram illustrating a structure of a binarization device according to a second embodiment of the present invention. Referring to FIG. 3, an input part 10 has a function of receiving an input image. A camera, scanner, a communication interface including a modem and a network, and a computer, among other devices, can serve as the input part 110. It is assumed herein the input image is comprised of 640 (column)×480 (row) pixels.

Block classification part 120 divides the input image received from the input part 110 into blocks having a preset block size, and classifies the divided blocks into character blocks and background blocks by analyzing pixels included in the divided blocks. The block classification part 120 classifies the divided blocks into character blocks and background blocks in order to optionally perform binarization on a region where characters are included. It is assumed herein that each of the blocks has a size of 8×8 pixels.

A block growing part 160 extends the character blocks classified by the block classification part 120. In the block classification process, a block containing character pixels can be incorrectly classified as a background block due to the influence of the background between character pixels. The block growing part 160 grows the character blocks in order to extend pixels in a character block erroneously classified as a background block.

Edge enhancement part 130 enhances edges of the character blocks using relations between character pixels and their neighboring pixels in the character blocks output from the block growing part 160, and generates pixels in which noise components are reduced. In addition, the edge enhancement part 130 calculates a threshold Th2 used for binarizing the pixels. The edge enhancement part 130 can include a quadratic filter or an improved quadratic filter.

Binarization part 140 compares the pixels of the character blocks output from the edge enhancement part 130 with the threshold Th2, and binarizes character pixels and background pixels into a first brightness value and a second brightness value, respectively. In addition, the binarization part 140 binarizes the pixels of the background pixels output from the block growing part 160 into the second brightness value. The binarization part 140 can include a compressor that compresses the binarized image before the binarized image is sent to a recognition part 150, so that efficiency of storage space can be improved.

Recognition part 150 recognizes the binarized signal output from the binarization part 140.

Figure 4:
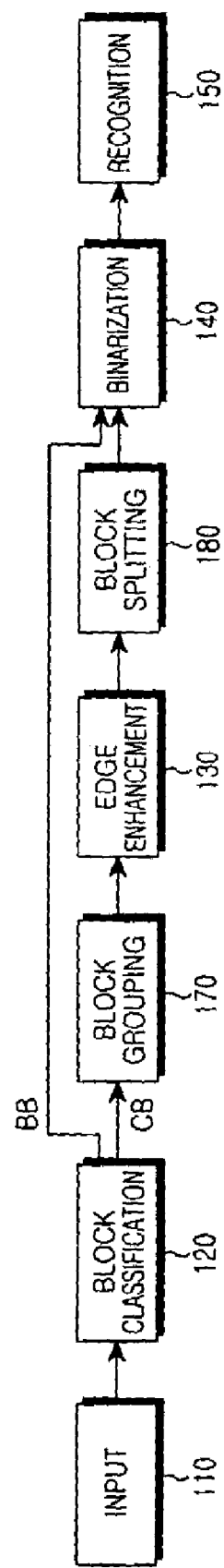
FIG. 4 is a block diagram illustrating a structure of an image binarization device according to a third embodiment of the present invention.

FIG. 4 is a block diagram illustrating a structure of a binarization device according to a third embodiment of the present invention. Referring to FIG. 4, an input part 110 has a function of receiving an input image. A camera, scanner, a communication interface including a modem and a network, and a computer, among other devices, can serve as the input part 110. It is assumed herein the input image is comprised of 640 (column)×480 (row) pixels.

Block classification part 120 divides the input image received from the input part 110 into blocks having a preset block size, and classifies the divided blocks into character blocks and background blocks by analyzing pixels included in the divided blocks. The block classification part 120 classifies the divided blocks into character blocks and background blocks in order to optionally perform binarization on a region where characters are included. It is assumed herein that each of the blocks has a size of 8×8 pixels.

Block grouping part 170 groups each of the character blocks output from the block classification part 120 with its 8 neighboring blocks, thereby generating grouped blocks. If a threshold is determined to discriminate background and character pixels using only one character block for the binarization process, discontinuity between blocks of the binarized image can occur as the difference between the determined threshold and a threshold of neighboring character blocks is very large. The block grouping part 170 performs the grouping function in order to extend a character block region and enhance the reliability of the binarization for the character block.

Edge enhancement part 130 enhances edges of the character blocks using relations between character pixels and their neighboring pixels in the grouped character blocks output from the block grouping part 170, and generates pixels in which noise components are reduced. In addition, the edge enhancement part 130 calculates a threshold Th2 used for binarizing the pixels. The edge enhancement part 130 can include a quadratic filter or an improved quadratic filter.

Block splitting part 180 receives the grouped blocks from the edge enhancement part 130, and separates the character blocks from the grouped blocks. Block splitting part 180 performs the function of separating only character blocks for binarization from the blocks grouped by the block grouping part 170.

Binarization part 140 compares the pixels of the character blocks separated by the block splitting part 180 with the threshold Th2, and binarizes character pixels and background pixels into a first brightness value and a second brightness value, respectively. In addition, binarization part 140 binarizes the pixels of the background pixels output from the block classification part 120 into the second brightness value. Binarization part 140 can include a compressor that compresses the binarized image before the binarized image is sent to a recognition part 150, so that efficiency of a storage space can be improved.

Recognition part 150 recognizes the binarized signal output from the binarization part 140.

Figure 5:
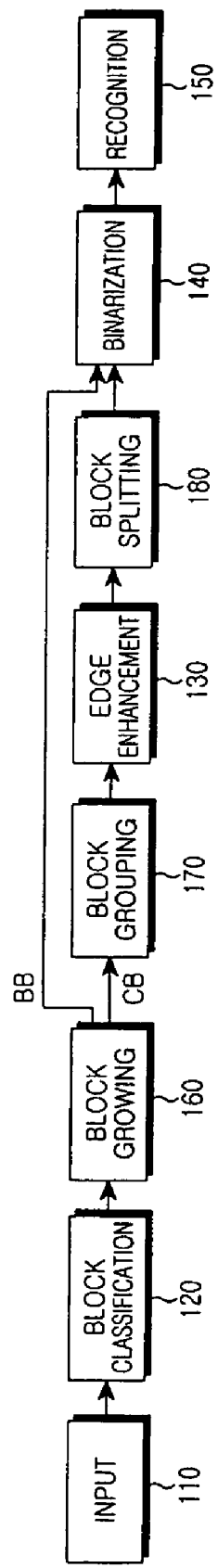
FIG. 5 is a block diagram illustrating a structure of an image binarization device according to a fourth embodiment of the present invention.

FIG. 5 is a block diagram illustrating a structure of a binarization device according to a fourth embodiment of the present invention. Referring to FIG. 5, an input part 110 has a function of receiving an input image. A camera, scanner, a communication interface including a modem and a network, and a computer, among other devices, can serve as the input part 110. It is assumed herein the input image is comprised of 640 (column)×480 (row) pixels.

Block classification part 120 divides the input image received from the input part 110 into blocks having a preset block size, and classifies the divided blocks into character blocks and background blocks by analyzing pixels included in the divided blocks. Block classification part 120 classifies the divided blocks into character blocks and background blocks in order to optionally perform binarization on a region where characters are included. It is assumed herein that each of the blocks has a size of 8×8 pixels.

Block growing part 160 extends the character blocks classified by the block classification part 120. In the block classification process, a block containing character pixels can be incorrectly classified as a background block due to the influence of a background between character pixels. The block growing part 160 grows the character blocks in order to extend pixels in a character block erroneously classified as a background block.

Block grouping part 170 groups each of the character blocks output from the block growing part 160 with its 8 neighboring blocks, thereby generating grouped blocks. If a threshold is determined to discriminate background and character pixels using only one character block (consisting of 8×8 pixels) for the binarization process, discontinuity between blocks of the binarized image can occur as the difference between the determined threshold of the one character block being small in size and a threshold of neighboring character blocks is very large. Block grouping part 170 performs the grouping function in order to extend a character block region and enhance the reliability of the binarization for the character block.

Edge enhancement part 130 enhances edges of the character blocks using relations between character pixels and their neighboring pixels in the grouped character blocks output from the block grouping part 170, and generates pixels in which noise components are reduced. In addition, the edge enhancement part 130 calculates a threshold Th2 used for binarizing the pixels. Edge enhancement part 130 can include a quadratic filter or an improved quadratic filter.

Block splitting part 180 receives the grouped blocks from the edge enhancement part 130, and separates the character blocks from the grouped blocks. Block splitting part 180 performs the function of separating only character blocks for binarization from the blocks grouped by the block grouping part 170.

Binarization part 140 compares the pixels of the character blocks separated by the block splitting part 180 with the threshold Th2, and binarizes character pixels and background pixels into a first brightness value and a second brightness value, respectively. In addition, the binarization part 140 binarizes the pixels of the background pixels output from the block growing part 160 into the second brightness value. Binarization part 140 can include a compressor that compresses the binarized image before the binarized image is sent to a recognition part 150, so that efficiency of a storage space can be improved.

Recognition part 150 recognizes the binarized signal output from the binarization part 140.

As described above, the binarization device according to a first embodiment of the present invention classifies an input image into blocks, and then classifies the divided blocks into character blocks and background blocks. The binarization device classifies the input image into character blocks and background blocks, in order to perform edge enhancement and binarization operations on the pixels in the character blocks and to fix pixels in the background blocks to a specified brightness value in a binarization process.

Compared with the binarization device according to the first embodiment, the binarization device according to the second embodiment grows the character blocks classified by the block classification part 120 before edge enhancement, in order to prevent character pixels from being included in a background block in the block classification process. In the second embodiment, the classified character blocks are grown, and thereafter, if character pixels are included in a block erroneously classified as a background block, the block is corrected.

Compared with the binarization device according to the first embodiment, the binarization device according to the third embodiment groups character blocks classified by the block classification part 120 with their neighboring blocks before edge enhancement, enhances edges of the grouped blocks, separates the original character blocks from the edge-enhanced groups, and then performs binarization on the separated character blocks. The reason for performing block grouping on the character blocks is as follows. Since the character block consists of a very small number of pixels, the character block is grouped with its neighbor blocks to extend its block region, so that edges of the grouped block are enhanced.

Finally, compared with the binarization device according to the first embodiment, the binarization device according to the fourth embodiment further includes the block growing part 160 and the block grouping part 170. A detailed description of the fourth embodiment of the present invention will now be made. In addition, it will be assumed that the image used herein is an image of a business card.

Input part 110 receives an input image having a size of N×M pixels. As discussed above, it is assumed herein that the image has a size of 640 (N)×480 (M) pixels. The input image can be a color image or grayscale image having no color information. In the fourth embodiment of the present invention, it is assumed that the image is a grayscale image. The input image is divided into blocks and then classified into character blocks and background blocks by the block classification part 120.

Figure 6:
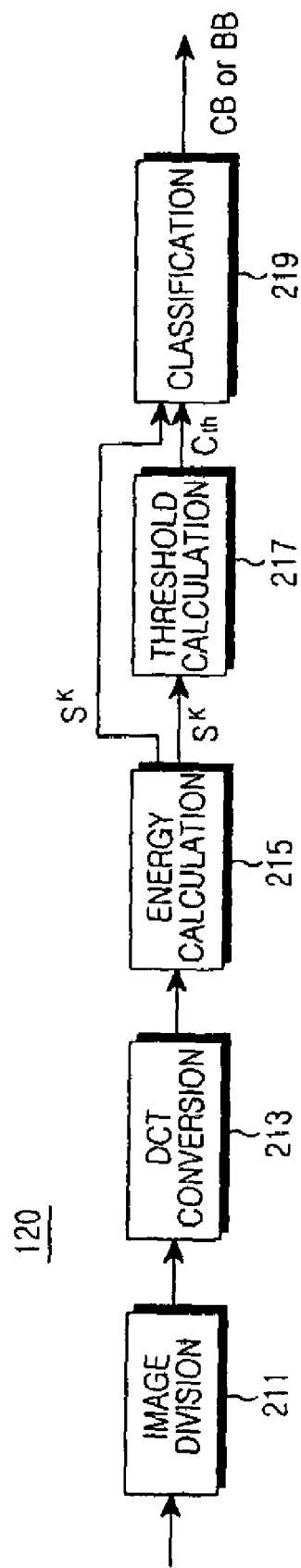
FIG. 6 is a block diagram illustrating a detailed structure of the block classification part of FIGS. 2 to 5 according to an embodiment of the present invention.

FIG. 6 is a block diagram illustrating a detailed structure of the block classification part 120 according to an embodiment of the present invention. The block classification part 120 performs the operation of dividing the input image into blocks having a predetermined size, and classifying the divided blocks into character blocks and background blocks. The block classification part 120 classifies the divided blocks into character blocks and background blocks in order to optionally perform binarization on a region where characters are included.

Referring to FIG. 6, image division part 211 divides the image into blocks having a predetermined size. Here, the image consists of 640×480 pixels, and each of the blocks consists of 8×8 pixels. In this case, the image division part 211 divides the image into 4800 blocks.

Figure 7A:
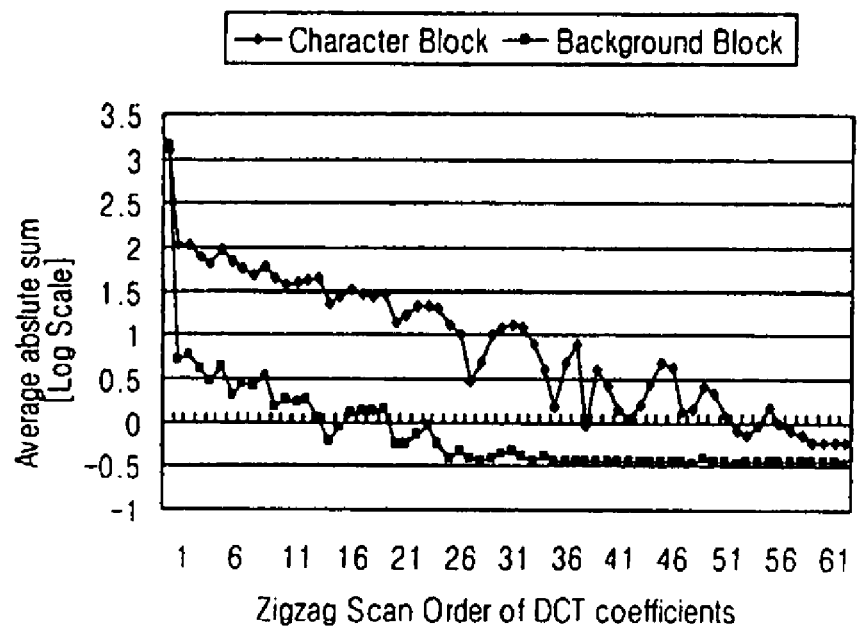
FIG. 7A is a diagram illustrating a comparison of energy distributions of DCT coefficients for the character blocks and the background blocks.
Figure 7B:
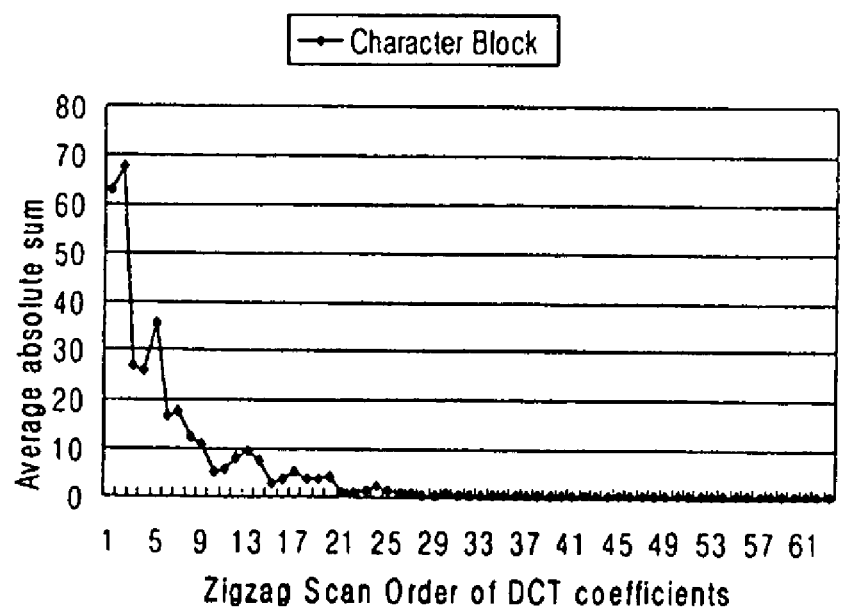
FIG. 7B is a diagram illustrating an energy distribution characteristic of DCT coefficients for the character blocks.
Figure 7C:
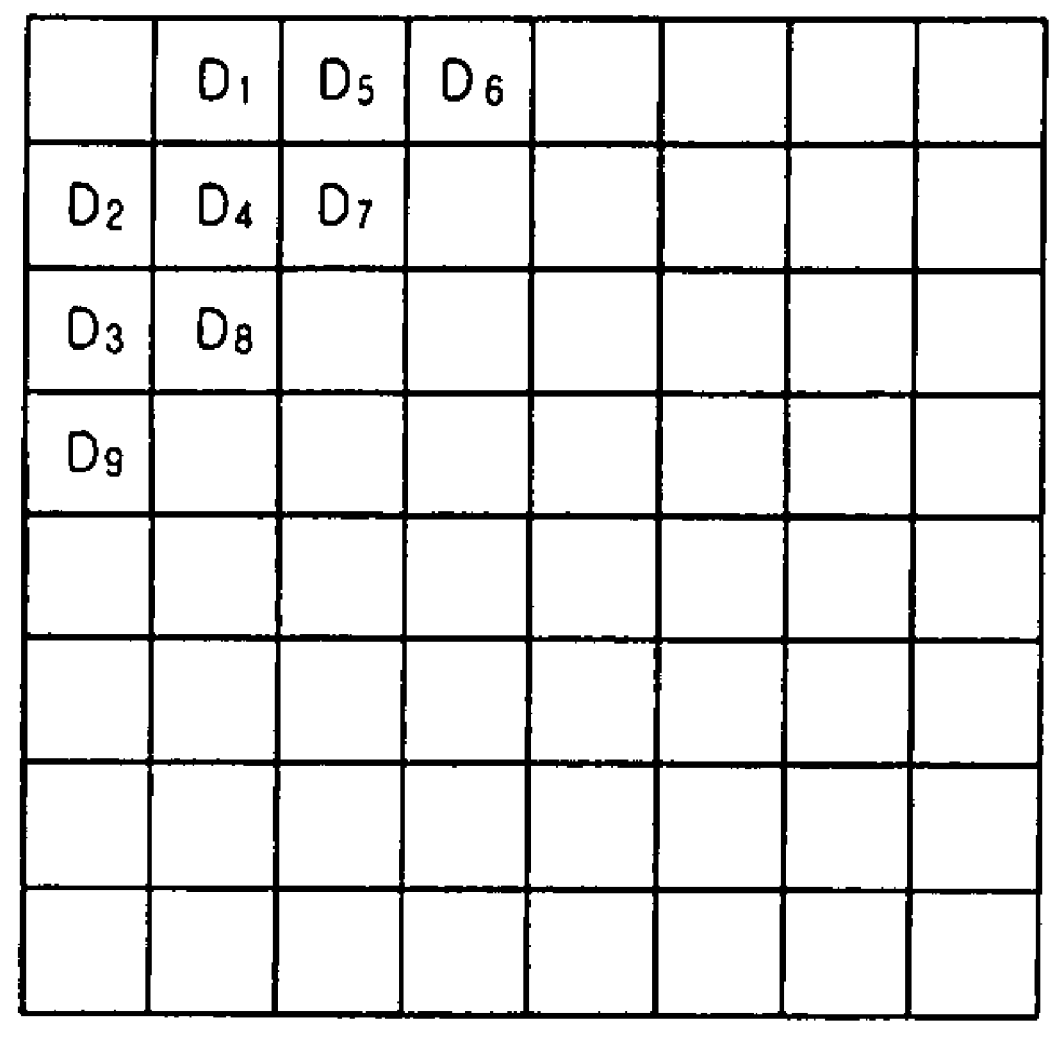

The blocks output from the image division part 211 are applied to a discrete cosine transform (DCT) conversion part 213, and the DCT conversion part 213 performs a DCT conversion on the blocks. An energy calculation part 215 calculates a sum of absolute values of dominant DCT coefficients within the DCT-converted blocks. In this case, an energy distribution value of the DCT coefficients within the character blocks is larger than that of DCT coefficients within the background blocks. FIG. 7A is a diagram illustrating a comparison of energy distributions of DCT coefficients for the character blocks and the background blocks. In FIG. 7A, the Y axis represents an average of the absolute sums in a log scale, and the X axis represents a zigzag scan order of the DCT coefficients. As illustrated in FIG. 7A, it can be noted that DCT coefficients of the character blocks are larger in their average values than the DCT coefficients of the background blocks. FIG. 7B is a diagram illustrating an energy distribution characteristic of DCT coefficients for the character blocks. In FIG. 7B, a Y axis represents an average of the absolute sums in a long normal scale, and an X axis represents a zigzag scan order of the DCT coefficients. As illustrated in FIG. 7B, it can be noted that the average of absolute sums of some DCT coefficients for the character blocks is relatively larger. Thus, in the fourth embodiment of the present invention, it is assumed that the dominant DCT coefficients used in a block classification process are $D_1 \sim D_9$ shown in FIG. 7C. Accordingly, a sum of the absolute values of the dominant DCT coefficients in a $k^{th}$ block can be calculated by $$S^k = \sum_{i=1}^{9} |D_i^k| \tag{1}$$

In Equation (1), $|D_i^k|$ denotes an $i^{th}$ dominant DCT coefficient of the $k^{th}$ block, and $S^k$ denotes the sum of the absolute values of the dominant DCT coefficients in the $k^{th}$ block. Thus, in the various embodiments of the present invention, a sum of the dominant DCT coefficients $D_1 \sim D_9$ is calculated.

The energy calculation part 215 performs the calculation of Equation (1) on all blocks (at k=0, 1, 2, ..., 4799). Energy values $S^k$ (k=0, 1, 2, ..., 4799) calculated block by block are applied to a threshold calculation part 217.

The threshold calculation part 217 sums up the energy values $S^k$ (k=0, 1, 2, ..., 4799) calculated block by block, and produces an average $<S^k>$ by dividing the summed energy value by the total number (TBN) of blocks. The average value $<S^k>$ is produced in accordance with Equation (2) below. The average value $<S^k>$ becomes a threshold Cth used for determining the blocks as character blocks or background blocks.

$$\langle S^k \rangle = \frac{1}{TBN} \sum_{k=1}^{TBN} S^k \qquad (2)$$
$$= Cth$$

In Equation (2), TBN denotes the total number of blocks.

Classification part 219 sequentially receives energy values (corresponding to sums of the absolute values of dominant DCT coefficients for the blocks) output from the energy calculation part 215 on a block-by-block basis. Classification part 219 classifies a corresponding block as a character block or a background block by comparing the received block energy values with a threshold Cth. Classification part 219 classifies the $k^{th}$ block as a character block if $S^k \geq Cth$ and classifies the $k^{th}$ block as a background block if $S^k < Cth$, as shown in Equation (3) below.

$$\text{IF } S^k \geq Cth \text{ then CB}$$
$$\text{else BB} \qquad (3)$$

Pixels in the character blocks classified by the classification part 120 can have gray levels between 0 and 255. The character blocks output from the block classification part 120 can be input to the edge enhancement part 120 (first embodiment of the present invention), the block growing part (second and fourth embodiments of the present invention), and the block grouping part (third embodiment of the present invention). Herein, it will be assumed that the character blocks are input to the block growing part 160.

The block growing part 160 grows a region of the classified character block. In the block classification process, a block containing character pixels may be incorrectly classified as a background block due to the influence of the background between character pixels. The block growing part 160 grows a character block in order to change a background block containing character pixels to a character block by extending the character block.

The block growing part 160 can be implemented using a morphological filter. The morphological filter grows a character block through an erosion operation subsequent to a dilation operation for the character block called a closing operation. The closing operation serves to fill an internal hole of a region. In the closing operation, the character block is first extended through the dilation operation, background blocks isolated between the character blocks are converted into the character blocks, and then an original block size is recovered through the erosion in accordance with the closing operation. The morphological filter is disclosed in a reference entitled "Digital Image Processing," by R. C. Gonzalez, R. Woods, et al., 2$^{nd}$ ed., Prentice Hall, pp. 519-560, 2002, the entire contents of which are incorporated herein by reference. The block growing part 160 changes a background block containing character pixels to a character block in the block growing process.

The character blocks output from the block growing part 160 can be input to the block grouping part 170 (fourth embodiment of the present invention) or the edge enhancement part 130 (second and third embodiments of the present invention). Herein, it will be assumed that the character blocks are input to the block grouping part 170.

Block grouping part 170 groups each of the character blocks output from the block classification part 120 or the block growing part 160 along with its 8 neighboring blocks, thereby generating grouped blocks in which each consisting of 24×24 pixels. A character block consists of 8×8 pixels. If a threshold is determined to discriminate background and character pixels using only one character block for the binarization process, discontinuity between blocks of the binarized image can occur as the difference between the determined threshold of the one character block being small in size and a threshold of neighboring character blocks is very large. Thus, as a region is extended so that the grouped blocks are generated and binarized, the reliability of the binarization can be enhanced.

The grouped block containing a character block output from the block grouping part 170 is applied to the edge enhancement part 130. The edge enhancement part 130 can receive character blocks output from the block classification part 120, the block growing part 160, or the block grouping part 170. Here, the character blocks output from the block classification part 120 and the block growing part 160 are blocks having a size of 8×8 pixels, while in the case of the grouped block output from the block grouping part 170 (blocks made by grouping character blocks to be binarized with their 8 neighboring blocks), the grouped block has a size of 24×24 pixels.

Figure 8:
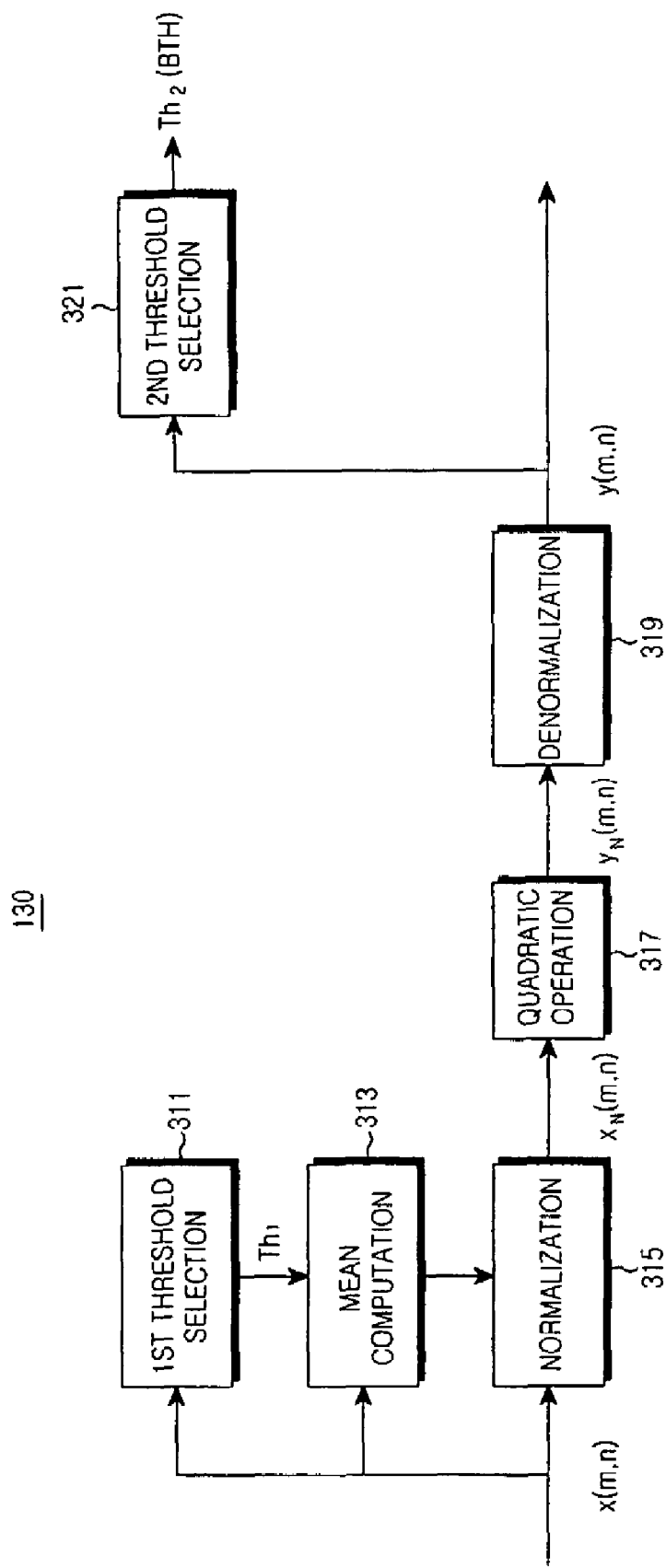
FIG. 8 is a block diagram illustrating an example of the edge enhancement part of FIGS. 3 to 6 according to an embodiment of the present invention.
Figures 9, 10:
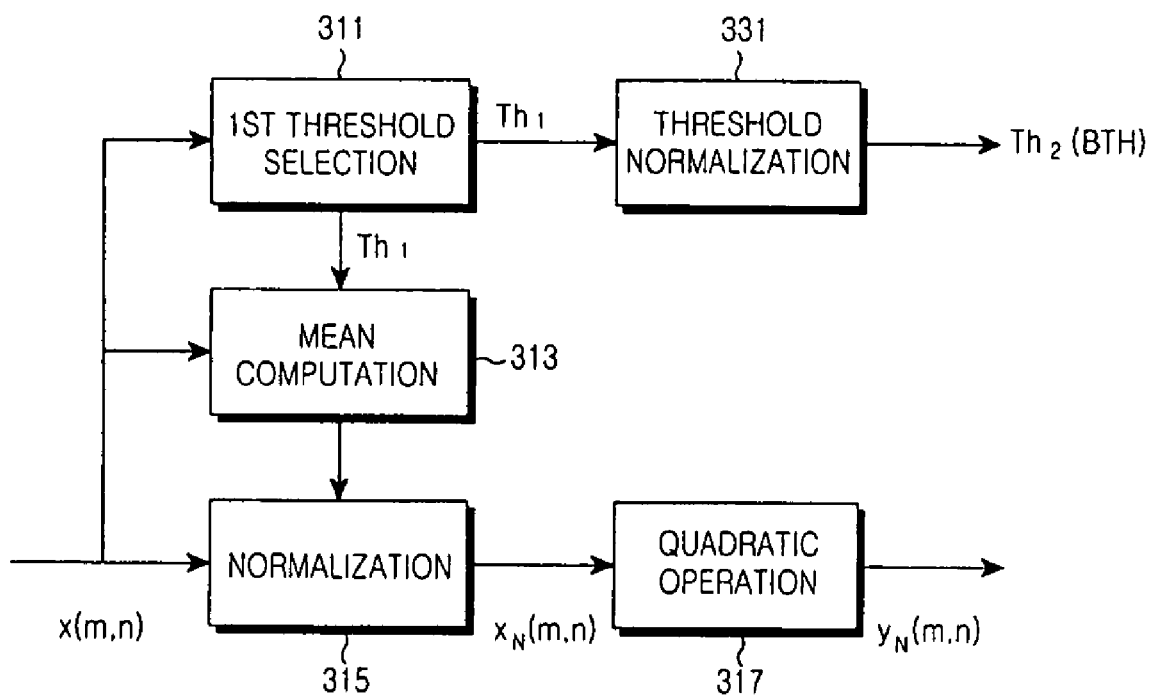
FIG. 9 shows a central pixel and its surrounding pixels processed by the quadratic operation part according to an embodiment of the present invention.
FIG. 10 is a block diagram illustrating another example of the edge enhancement part of FIGS. 3 to 6 according to an embodiment of the present invention.

Edge enhancement part 130 can include a quadratic filter (QF) or an improved quadratic filter (IQF). As shown in FIG. 8, the quadratic filter normalizes a character block, enhances edges of the normalized character block, denormalizes the edge-enhanced character block to convert the character block in the range of a brightness value before normalization, and generates, from the denormalized character blocks, a threshold BTH used for binarizing pixels of the character blocks. As shown in FIG. 10, the improved quadratic filter normalizes a character block, enhances edges of the normalized character block, normalizes a threshold calculated from the character block, and generates a threshold $BTH_N$ for binarizing pixels in the character block.

Operation of enhancing the edges of a character block using the quadratic filter will be now described with reference to FIG. 8.

Referring to FIG. 8, a first threshold selection part 311 calculates the first threshold Th1 for classifying pixels of the character block into character pixels and background pixels. The first threshold selection part 311 calculates the first threshold Th1 that is used for discriminating character and background pixels and normalizing two types of the discriminated pixels. The first threshold Th1 is selected as a gray value corresponding to the maximum between-class variance between the two types of discriminated pixels. The first threshold Th1 can be calculated using Otsu's method or Kapur's method. Otsu's method for calculating the first threshold Th1 is based on Equation (4) below. The method made by N. Otsu is disclosed in a paper entitled "A Threshold Selection Method from Gray-Level Histograms," *IEEE Trans. Systems, Man and Cybernetics*, Vol. SMC-9, No. 1, pp. 62-66, January 1979, the entire contents of which are incorporated herein by reference.

$$Th_1 = \underset{T}{\operatorname{argmax}} \; \sigma_B^2(T) \qquad (4)$$

$$\sigma_B^2(T) = P_1(\mu_1(T) - \mu)^2 + P_2(T)(\mu_2(T) - \mu)^2$$
$$= P_1(T)P_2(T)(\mu_1(T) - \mu_2(T))^2$$

$\sigma_B^2(T)$: between-class variance $T$: gray value $\mu$: mean of the total pixels $\mu_i(T)$: mean of each class defined by $T$ $P_i(T)$: relative frequency of each class A mean computation part 313 classifies pixels of the character block into character and background pixels on the basis of the first threshold Th1, and calculates mean brightness values for the character and background pixels for a character block. In the process of mean computation for two classes, pixels of the character block x(m, n) are classified into character pixels (CPs) and background pixels (BPs) on the basis of the first threshold Th1 in accordance with Equation (5) below, and then a mean brightness value $\mu_0$ for the character pixels and a 15 mean brightness value $\mu_1$ for the background pixels is calculated in accordance with Equation (6) below.

If $x(m, n) \geq Th1$ then CP else BP     (5)

In Equation (5), x(m, n) denotes a character block, and Th1 denotes a threshold for classifying the pixels of the character block into character and background pixels.

$$\mu_0 = \frac{S_c}{N_c} \qquad (6)$$
$$\mu_1 = \frac{S_b}{N_b}$$

In Equation (6), $S_c$ denotes the sum of brightness values for the character pixels, $N_c$ denotes the number of character pixels, $S_b$ denotes a sum of brightness values for the background pixels, and $N_b$ denotes the number of background pixels.

A normalization part 315 normalizes the pixels of the character block x(m, n) using the mean brightness value $\mu_0$ for the character pixels, and the mean brightness value $\mu_1$ for the background pixels from the mean computation part 313 so that the character pixels have values close to '1' while the background pixels have values close to '0'. The normalization part 315 performs a function of reducing a dynamic range of the brightness values for the input character block pixels by normalizing the pixels of the character block x(m, n) in accordance with Equation (7) below.

$$x_N(m, n) = \frac{(x(m, n) - \mu_1)}{(\mu_0 - \mu_1)} \qquad (7)$$

In Equation (7), $x_N(m, n)$ denotes a normalized character block, $\mu_0$ denotes a mean brightness value for the character pixels, and $\mu_1$ denotes a mean brightness value for the background pixels.

The normalized character block $x_N(m, n)$ is subject to a quadratic operation in a quadratic operation part 317, so that edges of the character block are enhanced and their noise components are reduced. The quadratic operation part 317 performs the function of enhancing edges using relations between the normalized pixels and their surrounding pixels, and reducing the noise components. FIG. 9 shows a central pixel and its surrounding pixels processed by the quadratic operation part 317. Equation (8) below has functional characteristics capable of enhancing the edges and reducing the noise components when the quadratic operation part 317 performs a quadratic operation. The quadratic operation part 317 "darkly" processes the character pixels and "brightly" processes the background pixels on the basis of a large gray level difference, such that character edges are processed clearly and simultaneously their noise components are removed.

$$y_0 = \left( h_0 x_0 + h_1 \sum_{i=1}^{4} x_{2i-1} + h_2 \sum_{i=1}^{4} x_{2i} \right) + \qquad (8)$$
$$\left( h_3 x_0^2 + h_4 \sum_{i=1}^{4} x_{2i-1}^2 + h_5 \sum_{i=1}^{4} x_{2i}^2 \right) + \left( h_6 \sum_{i=1}^{4} x_0 x_{2i-1} + h_7 \sum_{i=1}^{4} x_0 x_{2i} \right) +$$
$$\left( h_8 \sum_{i=1}^{4} x_{2i-1} x_{2i-1} + h_9 \sum_{i=1}^{4} x_{2i^*-1}(x_{2i} + x_{2i^{**}}) \right)$$

where $i^* = (i+1) \bmod 4$ and $i^{**} = (i+3) \bmod 4$

The output of the quadratic operation part 317 is input to the denormalization part 319, and the denormalization part 319 generates an output y(m, n) by denormalizing the quadratic-processed character block $y_N(m, n)$. The denormalization part 319 performs the function of converting pixels of the normalized character block in the range of a brightness value before normalization. The denormalization part 319 performs the denormalization operation in accordance with Equation (9) below.

$$y(m, n) = y_N(m, n)(\mu_0 - \mu_1) + \mu_1 \qquad (9)$$

The character block y(m, n) output from the denormalization block 319 is applied to the binarization part 140 and the second threshold selection part 321. The second threshold selection part 321 calculates a second threshold Th2 used when the binarization part 140 binarizes pixels of the character block into character pixels and background pixels. The second threshold Th2 corresponds to a threshold BTH of the binarization part 140. The second threshold selection part 321 is used because the denormalization part 319 denormalized the normalized character block back into a character block having its original brightness. The second threshold selection part 321 can calculate the threshold BTH (or second threshold Th2) using Otsu's method or Kapur's method. When Otsu's method is used, the second threshold selection part 321 calculates the threshold BTH by calculating pixels of the denormalized character block in accordance with Equation (4).

The edge enhancement part 130 shown in FIG. 8 reduces the dynamic range between light and dark pixels by normalizing the character and background pixels within a character block (or a grouped block containing the character block), performs a quadratic operation on the normalized pixels to enhance the edges of the character block (or the grouped block containing the character block), and denormalizing the normalized pixels of the normalized character block (or the grouped block containing the character block) in the original gray level range of the pixels. From the pixels of the denormalized character block, the edge enhancement part 130 calculates again a threshold for binarizing pixels of the character block.

It is also possible to enhance the edges of a character block (or a grouped block containing the character block) using the improved quadratic filter shown in FIG. 10, which is an improvement of the quadratic filter of FIG. 8. FIG. 10 is a block diagram illustrating the structure of the edge enhancement part 130 using the improved quadratic filter.

Referring to FIG. 10, a first threshold selection part 311 calculates the first threshold Th1 for classifying pixels of the character block into character pixels and background pixels. The first threshold selection part 311 is identical in operation to the first threshold selection part 311 of FIG. 8.

Mean computation part 313 classifies pixels of the character block into character and background pixels on the basis of the first threshold Th1, and calculates mean brightness values for the character and background pixels for a character block. The mean computation part 313 is identical in operation to the mean computation part 313 of FIG. 8.

Normalization part 315 normalizes the pixels of the character block x(m, n) using the mean brightness value $\mu_0$ for the character pixels and the mean brightness value $\mu_1$ for the background pixels from the mean computation part 313, so that the character pixels have values close to '1' while the background pixels have values close to '0'. The normalization part 315 is identical in operation to the normalization part 315 of FIG. 8.

Quadratic operation part 317 performs the function of enhancing edges using relations between the normalized pixels and their surrounding pixels, and reducing the noise components. FIG. 9 shows a central pixel and its surrounding pixels processed by the quadratic operation part 317. Equation (8) has functional characteristics capable of enhancing the edges and reducing the noise components when the quadratic operation part 317 performs a quadratic operation. The quadratic operation part 317 is identical in operation to the quadratic operation part 317 of FIG. 8.

The normalized character block (or a grouped block containing the character block) output from the quadratic operation part 317 is output without undergoing denormalization. Thus, in order to generate the threshold $BTH_N$ used by the binarization part 140 in binarizing pixels of the character block, a threshold normalization part 331 in the improved quadratic filter generates the second threshold Th2 by normalizing the first threshold Th1 calculated by the first threshold selection part 311. The second threshold Th2 is used as the threshold $BTH_N$ for the binarization operation for the character block pixels by the binarization part 140.

Threshold normalization part 331 normalizes the first threshold Th1 using a method equal to the normalization method of the normalization part 315. The threshold normalization part 331 normalizes the first threshold Th1 in accordance with Equation (10) below, to generate the second threshold Th2 (or the threshold $BTH_N$).

$$Th2 = \frac{(Th1 - \mu_1)}{(\mu_0 - \mu_1)} \quad (10)$$

In Equation (10), Th2 denotes a normalized threshold $BTH_N$ for allowing the binarization part 140 to discriminate the character and background pixels, $\mu_0$ denotes a brightness value for the character pixels, and $\mu_1$ denotes a mean brightness value for the background pixels.

The edge enhancement part 130 shown in FIG. 10 reduces the dynamic range by normalizing the character and background pixels within a character block (or a grouped block containing the character block), and performs a quadratic operation on the normalized pixels to enhance the edges of the character block (or the grouped block containing the character block (CB)). Since the character block (or the grouped block containing the CB) output from the quadratic operation part 317 is a normalized block, the threshold $BTH_N$ for the binarization of the character block pixels is generated by normalizing the first threshold Th1.

Figure 11A:
FIGS. 11A to 11C are examples of images illustrating a comparison of output characteristics between a quadratic filter and an improved quadratic filter in a binarization device according to an embodiment of the present invention.
Figure 11B:
Figure 11C:
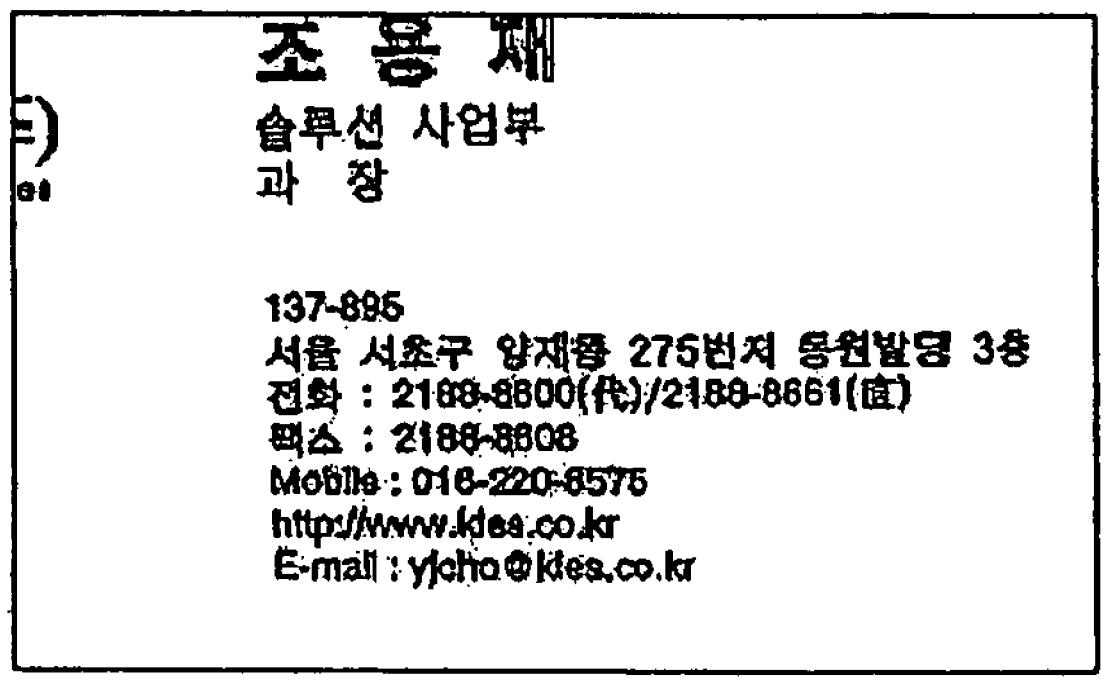

As described above, in the first to fourth embodiments of the present invention, the edge enhancement part 130 can be implemented using the quadratic filter of FIG. 8 or the improved quadratic filter of FIG. 10. The edge enhancement part 130 using the improved quadratic filter performs the function of enhancing edges while solving the drawback of a black block surrounding characters of the binarized image that occurs after the character block (or the grouped block containing the character block) is binarized. When the improved quadratic filter is used, the denormalization operation used in the quadratic filter is not performed. Therefore, when the quadratic filter is used, the edge enhancement part 130 denormalizes the quadratic-processed character block (or a grouped block containing the character block), and at the same time, calculates a threshold BTH from the denormalized character block (or the grouped block containing the character block). When the improved quadratic filter is used, however, the edge enhancement part 130 uses the intact quadratic-processed normalized character block (or the grouped block containing the character block), and calculates the threshold $BTH_N$ by normalizing the first threshold Th1. FIGS. 11A to 11C are examples of images for making a comparison of output characteristics between the quadratic filter (QF) and the improved quadratic filter (IQF). Specifically, FIG. 11A illustrates an example of an image input to the filter, FIG. 11B illustrates an example of an image after quadratic filtering, and FIG. 11C illustrates an example of an image after improved quadratic filtering.

When a character block is output from the edge enhancement part 130, the character block is applied to the binarization part 140, and when a grouped block containing a character block is output from the edge enhancement part 130, the grouped block is applied to the block splitting part 180. The block splitting part 180 receiving the grouped block containing a character block separates the character blocks from the grouped block. Separation of the character blocks from the grouped block is performed for image restoration after the surrounding blocks associated with the character block are grouped by the block grouping part 170. The block splitting part 180 separates the 8×8 center block from the 24×24 grouped block.

The character blocks output from the block splitting part 180 or the edge enhancement part 130 are input to the binarization part 140. The binarization part 140 receives the threshold output from the edge enhancement part 130 to binarize the pixels in the character blocks. The character blocks input into the binarization part 140 are y(m, n) (corresponding to character blocks output from the quadratic filter of FIG. 8) or $y_N$(m, n) (corresponding to character blocks output from the improved quadratic filter of FIG. 10). Thus, the threshold becomes BTH or $BTH_N$.

Binarization part 140 performs the binarization operation by classifying the received character block pixels into the character and background pixels using the threshold, and converting the classified character and background pixels into the two brightness values. The binarization part 140 compares the threshold corresponding to the input character block with values of the character block pixels, classifies the pixels as character pixels if the values of the character block pixels are equal to or larger than the threshold as a result of the comparison, and classifies the pixels as background pixels if the values of the character block pixels are smaller than the threshold. Binarization part 140 performs the binarization operation by converting the character pixels into a brightness value "α" and converts the background pixels into a brightness value "β" according to the result of classifications. A method for binarizing character block pixels by means of the binarization part 140 is defined as $$y_B(m, n) = \begin{cases} \alpha, & \text{if } y(m, n) \geq BTH \text{ or if } y_N(m, n) \geq BTN_N \\ \beta, & \text{otherwise} \end{cases} \quad (11)$$

In Equation (11), y(m, n) and BTH denote a character block and a threshold output from the quadratic filter, respectively, $y_N$(m, n) and $BTH_N$ denote a character block and a threshold output from the improved quadratic filter, respectively, and $y_B$(m, n) denotes pixels of the binarized character block.

Binarization part 140 receives a background block from the block classification part 120 or the block growing part 160, and collectively converts the background block pixels into the brightness value "β".

FIGS. 12 to 15 are flowcharts illustrating binarization procedures according to first to fourth embodiments of the present invention, respectively.

Figure 12:
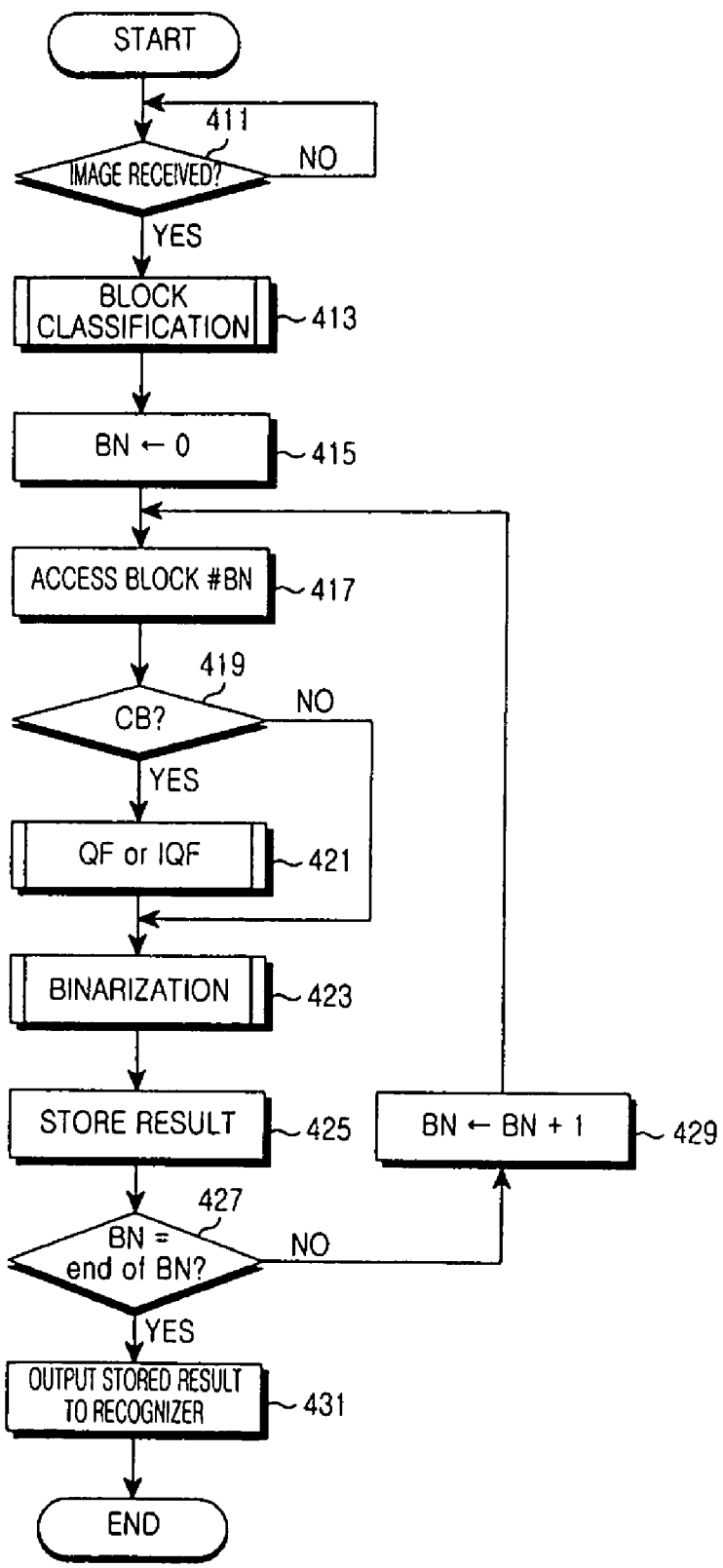
FIG. 12 is a flowchart illustrating an image binarization method according to a first embodiment of the present invention.

The binarization operation according to the first embodiment of the present invention will now be described with reference to FIG. 12. In step 411 it is determined whether an image has been received. If an image has been received ("Yes" path from decision step 411), the procedure proceeds to step 413. In step 413, the received image is divided into blocks having a predetermined size, and the divided blocks are classified into character blocks and background blocks.

Figure 15:
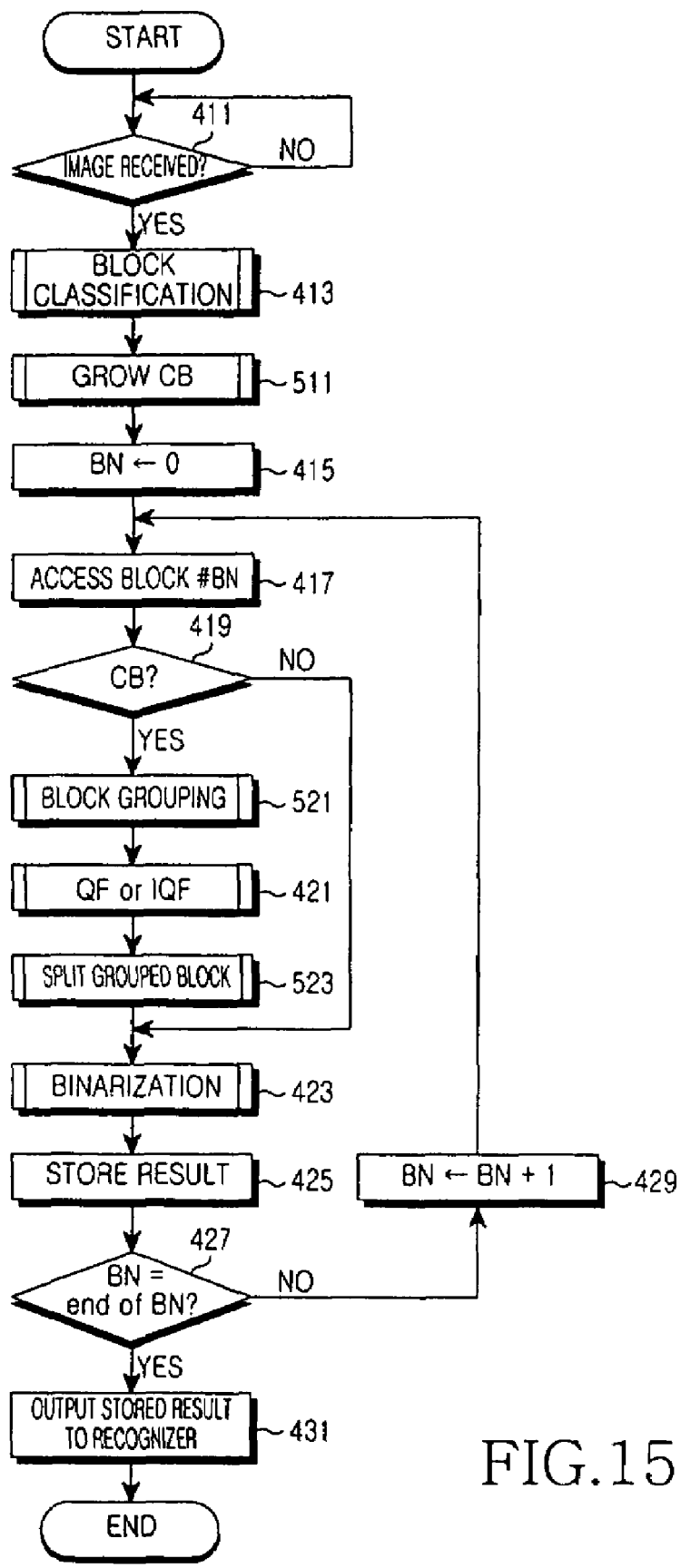
FIG. 15 is a flowchart illustrating an image binarization method according to a fourth embodiment of the present invention.
Figure 16:
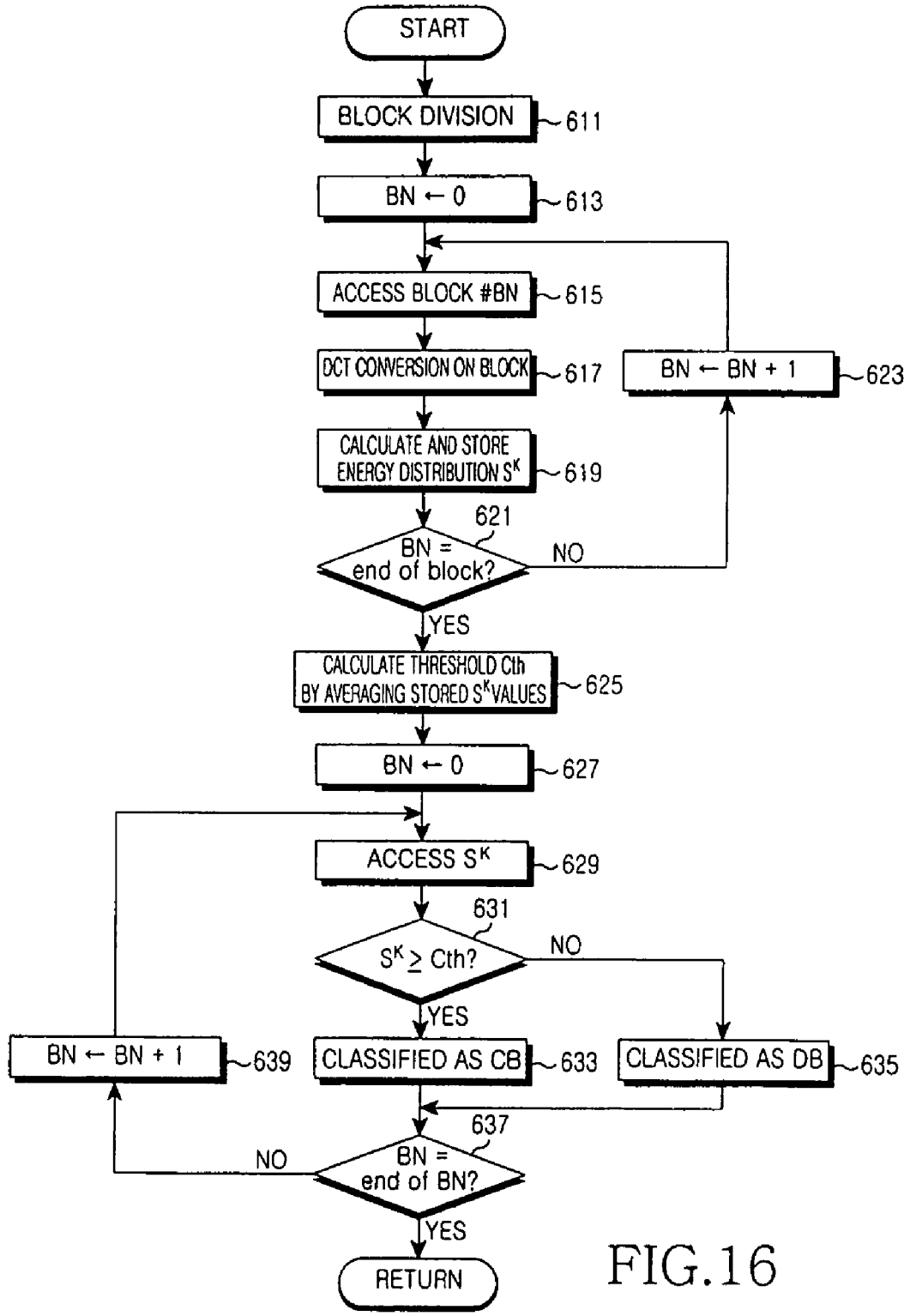
FIG. 16 is a flowchart illustrating the block classification process of FIGS. 12 to 15 according to an embodiment of the present invention.

FIG. 16 is a flowchart illustrating the procedure for dividing an input image into blocks and classifying divided blocks into character blocks and background blocks according to an embodiment of the present invention. FIG. 16 represents the operations performed in element 413 of FIGS. 12-15. Referring to FIG. 16, in step 611, the image division part 211 divides an input image into blocks having a predetermined size. The image consists of 640×480 pixels, and each of the blocks consists of 8×8 pixels. In this case, the input image is divided into 4800 blocks.

Thereafter, a block number BN is set to 0 in step 613, and a block with the block number BN is accessed in step 615. In step 617, the DCT conversion part 213 DCT-converts the accessed block. In step 619, the energy calculation part 215 calculates the sum $S^k$ of absolute values of dominant DCT coefficients within the DCT-converted block, and then stores the calculated sum $S^k$. In this case, an energy distribution value of the DCT coefficients within the character blocks is larger than that of DCT coefficients within the background blocks. Energy distributions of the DCT coefficients for the character blocks and the background blocks show a characteristic illustrated in FIG. 7A. In addition, the energy distribution characteristic of DCT coefficients for the character blocks shows the characteristic illustrated in FIG. 7B. Therefore, the sum $S^k$ of absolute values of the DCT coefficients in the $k^{th}$ block can be calculated in accordance with Equation (1). Here, 'k' is the same parameter as BN, and denotes a block number. After the $S^k$ is calculated in step 619, it is determined in step 621 whether $S^k$ of the last block is calculated. If $S^k$ of the last block is not calculated yet ("No" path from decision step 621), the procedure increases the block number by one in step 623, and then returns to step 615 to repeat the above operation (steps 615 through 621).

Through repetition of the steps 615 to 623, DCT conversion part 213 DCT-converts the respective blocks and the energy calculation part 215 performs the calculation of Equation (1) on all blocks (at k=0, 1, 2, . . . , 4799). In step 625 ("Yes" path from decision step 621), the block energy values $S^k$ (k=0, 1, 2, . . . , 4799) are applied to the threshold calculation part 217, and the threshold calculation part 217 sums the energy values $S^k$ (k=0, 1, 2, . . . , 4799), and calculates an average $<S^k>$ by dividing the summed energy value by the total number TBN of blocks. The average value $<S^k>$ is produced in accordance with Equation (2). The average value $<S^k>$ becomes a threshold Cth used for determining the blocks as character blocks or background blocks.

After the threshold Cth is calculated, the operation of classifying the blocks into character blocks and background blocks is performed. For that purpose, a block number BN is initialized to '0' in step 627, and $S^k$ of a block with the block number BN is accessed in step 629. Thereafter, in step 631, the classification part 219 classifies the corresponding block as a character block or a background block by comparing $S^k$ of the block with the threshold Cth. Classification part 219 classifies, in step 633, the $k^{th}$ block as a character block (CB) if $S^k \geq$ Cth ("Yes" path from decision step 631) and classifies in step 635 the $k^{th}$ block as a background block if $S^k <$ Cth as shown in Equation (3) ("No" path from decision step 631). Thereafter, it is determined in step 637 whether the classified block is the last block. If the block #BN is not the last block ("No" path from decision step 637), the procedure increases the block number by one in step 639, and then returns to step 629 to repeat the above operation. When the above operation is completely performed, the block classification results are output. After the image is divided into the blocks, the divided blocks are classified into character blocks and background blocks.

Referring back to FIG. 12, after the block classification is completed, a block number BN is initialized to '0' in step 415, and a block #BN is accessed in step 417. It is then determined, in step 419, whether the accessed block #BN is a character block. If the accessed block is a background block ("Yes" path from decision step 419), the procedure proceeds to step 423 where pixels of the background block are collectively binarized into a brightness value β. The binarized result is stored in step 425. It is then determined, in step 427, whether the currently binarized block is the last block of the image. If the binarized block is not the last block ("No" path from decision step 427), the procedure increases the block number BN by one in step 429, and then returns to step 417 to repeat the above operation (steps 417-427).

However, if it is determined in step 419 that the access block is a character block ("No" path from decision step 419), the procedure proceeds to step 421 where a quadratic filtering operation for reducing noises of the character block and enhancing edges of the character block is performed. The procedure for reducing noise of the character block and enhancing edges of the character block is performed by the quadratic filter of FIG. 8 or the improved quadratic filter of FIG. 10.

The operation of enhancing edges of a character block using the quadratic filter of FIG. 8 will now be described.

First, the first threshold Th1 for classifying pixels of the character block into character pixels and background pixels is calculated. The first threshold Th1 is used for discriminating character and background pixels and normalizing two types of the discriminated pixels in the next step. The first threshold Th1 is selected as a gray value corresponding to the maximum between-class variance between the two types of discriminated pixels in accordance with Equation (4).

Second, pixels of the character block are classified into character and background pixels on the basis of the first threshold Th1, and mean brightness values for the character and background pixels for a character block are calculated. In the process of mean computation for two classes, pixels of the character block x(m, n) are classified into character pixels and background pixels on the basis of the first threshold Th1 in accordance with Equation (5), and then a mean brightness value $\mu_0$ for the character pixels and a mean brightness value $\mu_1$ for the background pixels are calculated in accordance with Equation (6).

Third, the pixels of the character block x(m, n) are normalized using the mean brightness value $\mu_0$ for the character pixels and the mean brightness value $\mu_1$ for the background pixels from the mean computation part 313 so that the character pixels have values close to '1' while the background pixels have values close to '0'. The character block normalization method normalizes the pixels of the character block x(m, n) in accordance with Equation (7).

Fourth, the normalized character block $x_N$(m, n) is subject to the quadratic operation, so that the edges of the character block are enhanced and their noise components are reduced. In the quadratic operation process, the character pixels are "darkly" processed and the background pixels are "brightly" processed on the basis of a large gray level difference, such that the character edges are processed clearly, and their noise components are simultaneously removed. Such an operation is performed in accordance with Equation (8).

Fifth, an output y(m, n) is generated by denormalizing the quadratic-processed character block $y_N$(m, n). The denormalization process performs a function of converting pixels of the normalized character block in the range of a brightness value before normalization. The denormalization operation is performed in accordance with Equation (9).

Sixth, the second threshold Th2 is calculated using the character block y(m, n) generated in the denormalization process. The second threshold Th2 corresponds to a threshold BTH for binarizing pixels of the character block into character pixels and background pixels. The second threshold Th2 can be calculated using Otsu's method or Kapur's method. When Otsu's method is used, the second threshold Th2 (or the threshold BTH) is determined by calculating pixels of the denormalized character block in accordance with Equation (4).

The operation of enhancing the edges of a character block using the improved quadratic filter of FIG. 10 will now be described.

First, the first threshold Th1 for classifying pixels of the character block into character pixels and background pixels is calculated. The first threshold calculation method is identical to the first threshold calculation method of FIG. 8.

Second, pixels of the character block are classified into character and background pixels on the basis of the first threshold Th1, and then mean brightness values for the character and background pixels for a character block are calculated. The mean brightness value calculation method is identical to the mean brightness value calculation method of FIG. 8.

Third, the pixels of the character block x(m, n) are normalized using the mean brightness value $\mu_0$ for the character pixels and the mean brightness value $\mu_1$ for the background pixels so that the character pixels have values close to '1' while the background pixels have values close to '0'. The normalization method is also identical to the normalization method of FIG. 8.

Fourth, by performing a quadratic operation using relations between the normalized pixels and their surrounding pixels, edges of the character block are enhanced and the noise components of the character block are reduced. The quadratic operation is also identical to the quadratic operation of FIG. 8.

Fifth, the second threshold Th2 is calculated by normalizing the first threshold Th1. This is because the normalized character block is delivered to the binarization part without denormalization of the quadratic-processed character block. If the improved quadratic filtering of FIG. 10 is used, the second threshold Th2 is calculated by normalizing the first threshold Th1 in accordance with Equation (10).

As described above, in the embodiments of the present invention, the quadratic filter of FIG. 8 or the improved quadratic filter of FIG. 10 can be used to enhance edges of a character block. The improved quadratic filter performs the function of enhancing edges, while solving the drawback of a black block surrounding characters of the binarized image that occurs after the character block is binarized using the quadratic filter. When the improved quadratic filter is used, the denormalization operation used in the quadratic filter is not performed. Therefore, when the quadratic filter is used, the quadratic-processed character block is denormalized, and at the same time, a threshold BTH is calculated from the denormalized character block. However, when the improved quadratic filter is used, the intact quadratic-processed normalized character block is used, and the threshold $BTH_N$ is calculated by normalizing the first threshold Th1.

After noise of the character block is reduced and the edges of the character block are enhanced using the quadratic filter or the improved quadratic filter in step 421, a binarization operation is performed in step 423 by comparing pixels of the character blocks with the threshold BTH or $BHT_N$. In the binarization process, if the pixel values are smaller than the threshold BTH or $BTH_N$, the corresponding pixels are converted into the brightness value β for background pixels, and if the pixel values are larger than the threshold BTH or $BTH_N$, the corresponding pixels are converted into the brightness value α for character pixels. Brightness values of character block pixels are compared with the threshold BTH, and binarized into brightness value for character pixels or brightness value for background blocks. The binarized results are stored in step 425. If it is determined, however, in step 419, that the accessed block is a background block ("No" path from decision step 419), the edge enhancement operation is not performed and the pixels of the background block are collectively binarized into the brightness value for background pixels in step 423.

Figure 17:
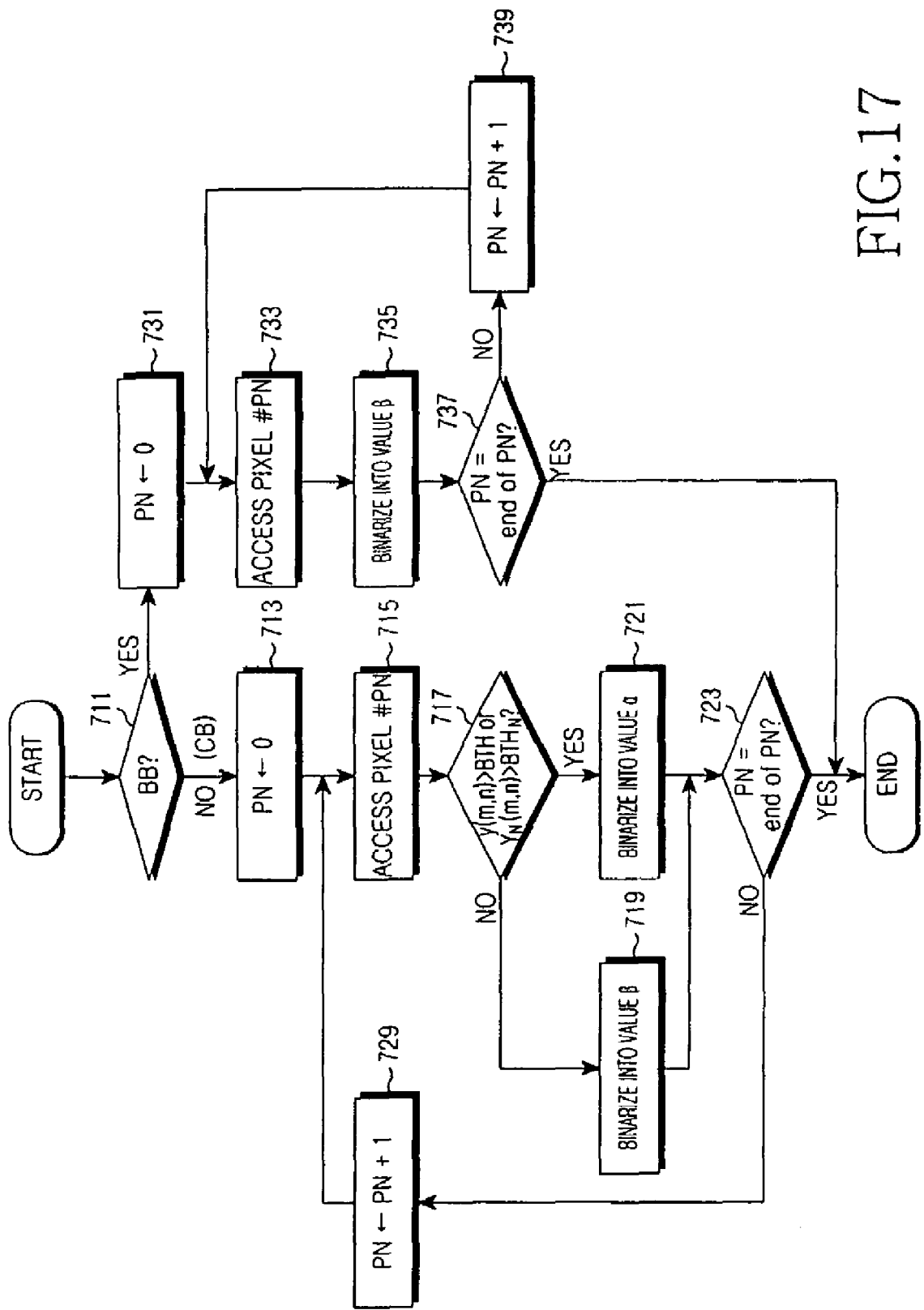
FIG. 17 is a flowchart illustrating the binarization process of FIGS. 12 to 15 according to an embodiment of the present invention.

FIG. 17 is a flowchart illustrating the binarization operation, 413, used in FIGS. 12-15. Referring to FIG. 17, the binarization part 140 determines in step 711 whether a received block is a character block or a background block. If the received block is a character block ("No" path from decision step 711), the binarization part 140 initializes a pixel number PN to '0' in step 713, and then accesses a pixel #PN in step 715. The pixel of the character block is quadratic-processed pixel by the quadratic filter of FIG. 8 or the improved quadratic filter of FIG. 10. Thereafter, in step 717, the binarization part 140 compares a value of the accessed pixel with the threshold in accordance with Equation (11). If the brightness value of the accessed pixel is larger than or equal to the threshold ("Yes" path from decision step 717), the corresponding pixel is converted into a brightness value α for character pixels in step 721, and if the brightness value of the accessed pixel is smaller than the threshold ("No" path from decision step 717), the corresponding pixel is converted into a brightness value β for background pixels in step 719. Thereafter, the binarization part 140 determines in step 723 whether the binarization process is completed for all pixels of the corresponding character block. If the binarization process is not completed ("No" path from decision step 723), the binarization part 140 increases the pixel number PN by one in step 729, and then returns to step 715 to repeat the above binarization operation. Throughout this binarization process, all pixels of the character block are binarized into a brightness value α or a brightness value β. However, if it is determined in step 711 that the received block is a background block ("Yes" path from decision step 711), the binarization part 140 performs steps 731 to 739 in which all pixels of the background block are collectively converted into the brightness value β for background pixels.

Referring back now to FIG. 12, after the binarization operation is performed, it is determined in step 427 whether the currently binarized block is the last block of the image. If the current block is not the last block ("No" path from decision step 427), the procedure increases the block number BN by one in step 429, and then returns to step 417 to repeat the above operation (step 417 through step 427). Through repetition of the above operation, the character blocks and the background blocks of the image are binarized. In the meantime, if it is determined in step 427 that binarization on the last block of the image is completed, the binarized results of the image are provided to the binarization part 140 in step 431.

Figure 13:
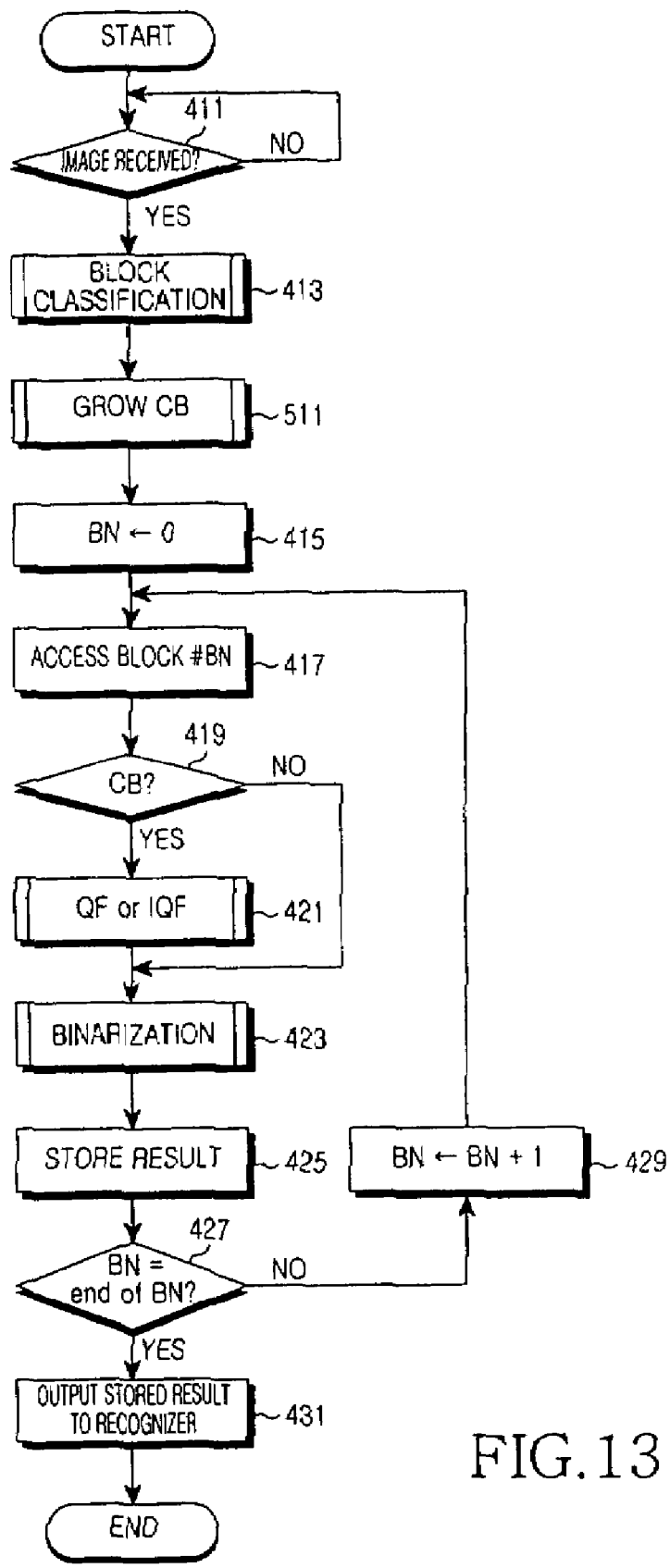
FIG. 13 is a flowchart illustrating an image binarization method according to a second embodiment of the present invention.

A binarization operation according to the second embodiment of the present invention will now be described with reference to FIG. 13. In the second embodiment, blocks of an input image are classified into character blocks and background blocks in step 413, and then the character blocks are grown in step 511. The block classification process is performed as discussed above in reference to FIG. 16. In the block classification process, a block containing character pixels can be incorrectly classified as a background block due to the influence of a background between character pixels. Therefore, in the block growing process of step 511, the character blocks are grown so that a character pixel can be included in a character block.

Block growing is aimed at changing a background block containing character pixels to a character block by extending the character block. Block growing can be implemented using a morphological filter. The morphological filter grows a character block through an erosion operation subsequent to a dilation operation for the character block called a closing operation. The closing operation serves to fill an internal hole of a region. The character block is extended through the dilation operation, background blocks isolated between the character blocks are converted into the character blocks, and an original block size is recovered through the erosion in accordance with the closing operation. The other operations are equal to those in the first embodiment of FIG. 12.

Figure 14:
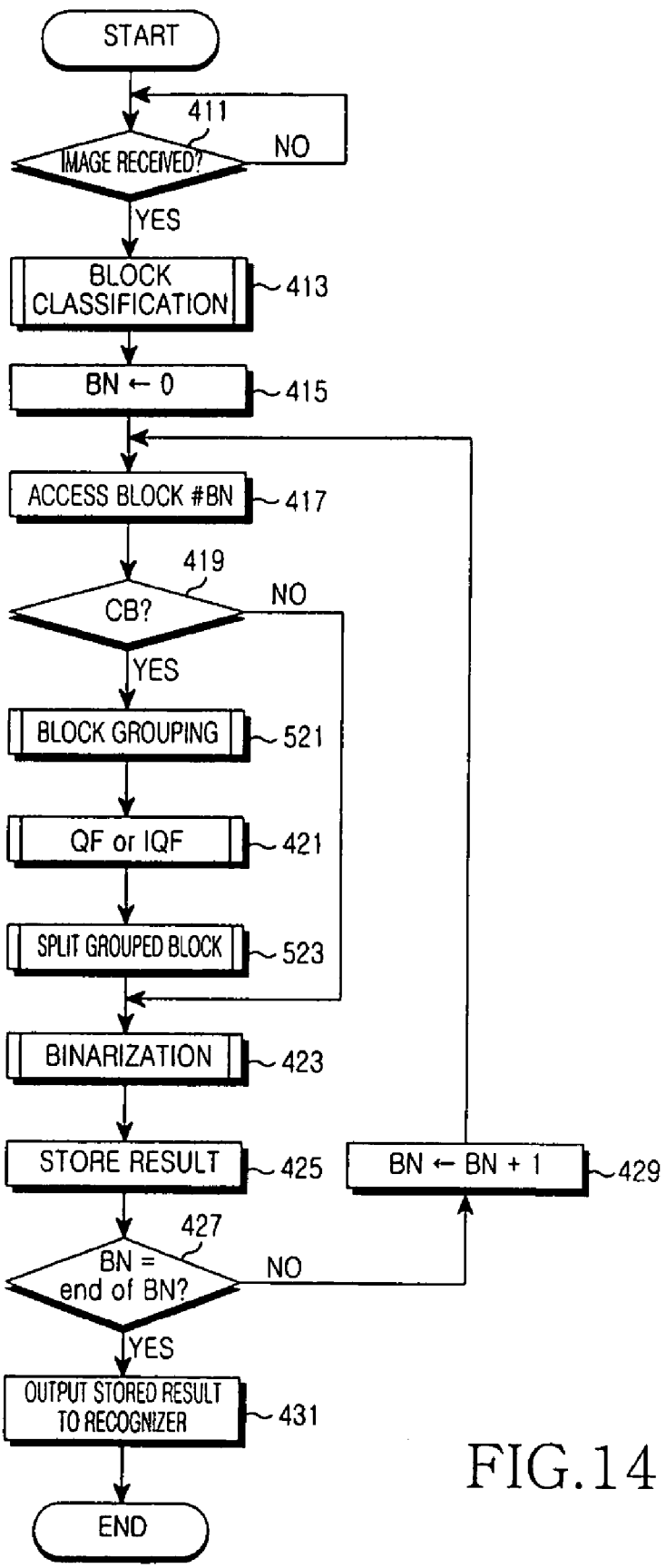
FIG. 14 is a flowchart illustrating an image binarization method according to a third embodiment of the present invention.

A binarization operation according to the third embodiment of the present invention will now be described with reference to FIG. 14. If it is determined in step 411 that an image is received ("Yes" path from decision step 411), the received image is divided into blocks having a predetermined size and then classified into character blocks and background blocks in step 413. The block classification process is performed as discussed above in reference to FIG. 16. A binarization process on the character blocks includes the edge enhancement process of FIG. 8 or 10, and the binarization process of FIG. 17.

If a threshold is determined to discriminate background and character pixels using only one character block (consisting of 8×8 pixels) for the binarization process, discontinuity between blocks of the binarized image can occur as a difference between the determined threshold of the one character block being small in size and a threshold of neighboring character blocks is very large. Therefore, in step 521, each of the classified character blocks is grouped with its 8 neighboring blocks, thereby generating grouped block having a size of 24×24 pixels. After the character blocks to be binarized are grouped with their neighboring blocks in the block grouping process, pixels of the extended blocks are subject to quadratic filtering in step 421. Thereafter, in step 523, a central character block having a size of 8×8 pixels is separated from the quadratic-filtered or improved quadratic-filtered grouped block. In steps 423 to 429, pixels of the separated character block are binarized based on the threshold BTH or $BTH_N$. The other operations are equal to those in the first embodiment of FIG. 12.

A binarization operation according to the fourth embodiment of the present invention will now be described with reference to FIG. 15. In the fourth embodiment, blocks of an input image are classified into character blocks and background blocks in step 413, and then the character blocks are grown in step 511. In the block classification process, a block containing character pixels can be incorrectly classified as a background block due to the influence of a background between character pixels. Therefore, in the block growing process of step 511, the character blocks are grown so that a character pixel can be included in a character block.

Thereafter, a binarization process is performed on the character blocks and the background blocks according to the block classification result. If an accessed block is a character block, the character block is grouped in step 521 with its 8 neighboring blocks, thereby generating grouped block having a size of 24×24 pixels. If binarization is performed using only one character block (consisting of 8×8 pixels), the binarization can be affected by the noises in the character block as it is too small in size. Therefore, a character block to be binarized is grouped with its 8 neighboring blocks to extend its region in the block grouping process, and then, in step 421, pixels in the extended block are subject to quadratic filtering or improved quadratic filtering. Thereafter, in step 523, a central character block having a size of 8×8 pixels is separated from the quadratic-filtered or improved quadratic-filtered grouped block. In steps 423 to 429, pixels of the separated character block are binarized based on the threshold BTH or $BTH_N$. The other operations are equal to those in the first embodiment of FIG. 12.

Figure 18:
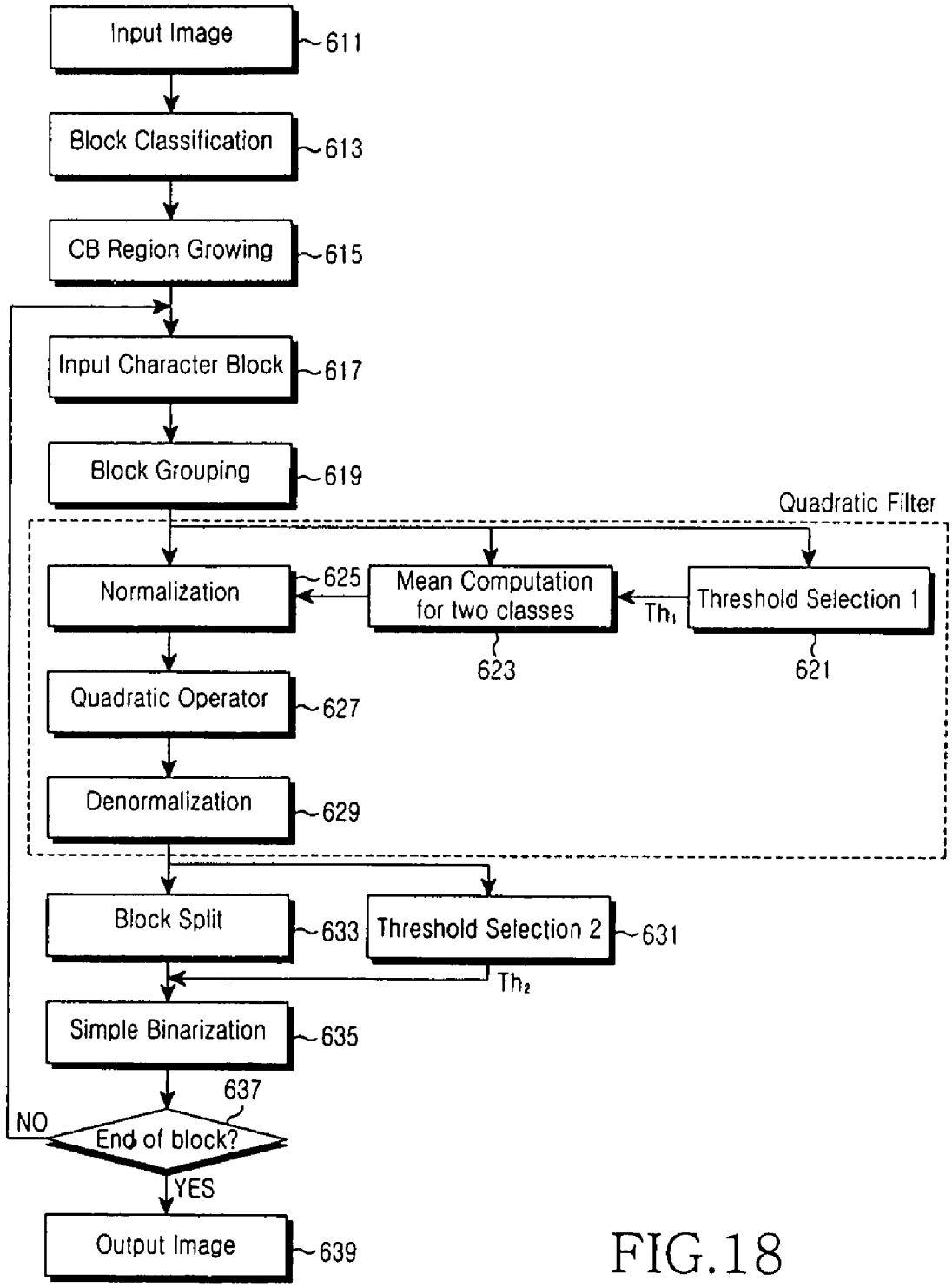
FIG. 18 is a flowchart illustrating an image binarization method when the quadratic filter is used in accordance with an embodiment of the present invention.

FIG. 18 is a flowchart illustrating an example of a binarization method in which the edge enhancement part 130 is implemented using the quadratic filter in accordance with an embodiment of the present invention. FIG. 18 shows a binarization method according to the fourth embodiment of the present invention in which the quadratic filter is used. FIGS. 19A to 19I are diagrams illustrating images generated when the binarization is performed in the procedure of FIG. 18.

Figure 19A:
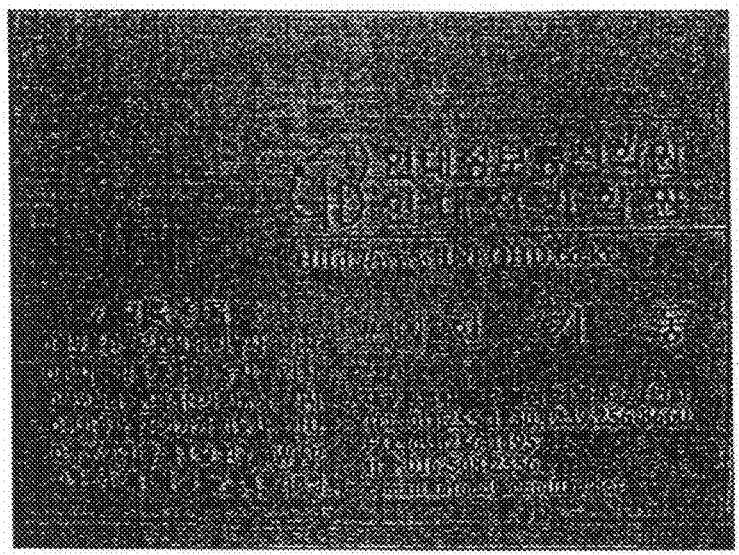
FIGS. 19A to 19I are examples of images illustrating images generated in each step of the binarization procedure of FIG. 18.

Referring to FIG. 18, in step 611, the input part 110 receives an input image shown in FIG. 19A. FIGS. 19A-I are examples of images generated in each step of the binarization procedure of FIG. 18. It is assumed that the image consists of 640 (columns)×480 (rows) pixels. In step 613, the block classification part 120 divides the input image as represented by FIG. 19A received from the input part 110 into blocks, analyzes pixels of the divided blocks, and classifies the divided blocks into character blocks and background blocks.

Figure 19B:
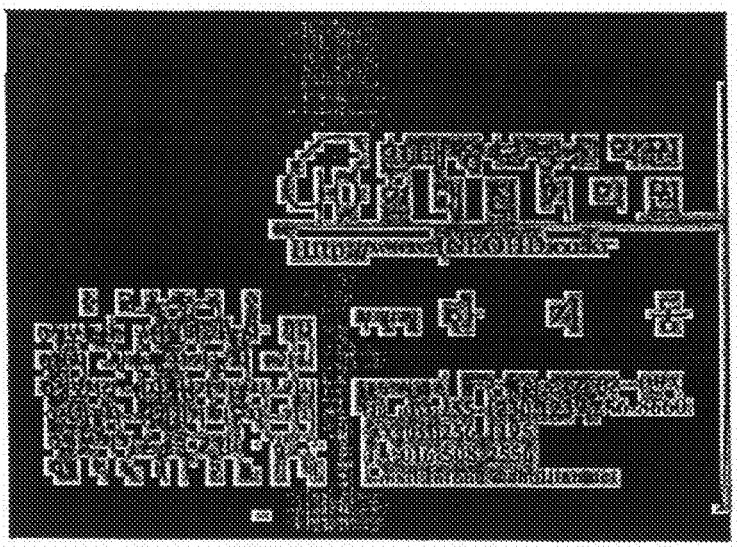

The input image is divided into 8×8-pixel blocks, and then classified into character blocks and background blocks shown in FIG. 19B. In FIG. 19B, which is an example of an input image, gray portions represent regions classified as character blocks, while black portions represent regions classified as background blocks.

Figure 19C:
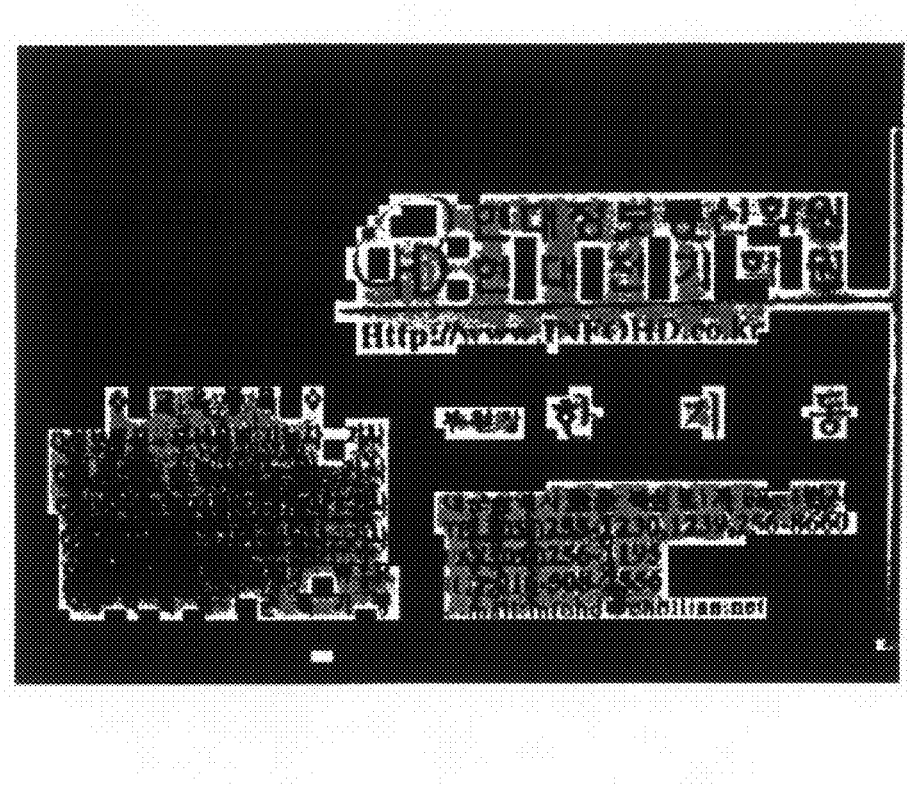
Figure 19D:
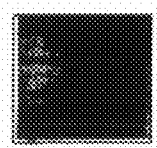

In step 615, the block growing part 160 extends the character blocks classified by the block classification part 120 as shown in FIG. 19C. In the block classification process, a block containing character pixels can be incorrectly classified as a background block due to the influence of a background between character pixels. The block growing part 160 grows the character blocks in order to extend pixels in a character block incorrectly classified as a background block. Then, in step 617, the block growing part 160 sequentially outputs grown character blocks of FIG. 19C to the block grouping part 170. The image output to the block grouping part 170 corresponds to the character blocks shown in FIG. 19D. In step 619, the block grouping part 170 receives the character blocks of FIG. 19D output from the block growing part 160, and groups each of the character blocks with its 8 adjacent blocks, generating the grouped blocks of FIG. 19E.

Figure 19E:
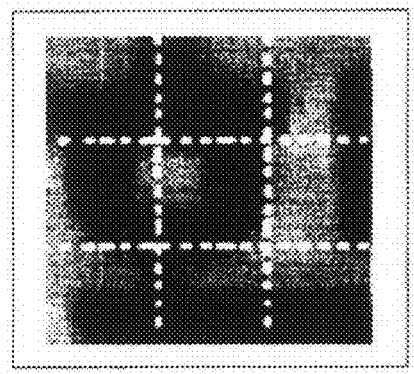

The grouped block image of FIG. 19E is input into the edge enhancement part 130. The edge enhancement part 130 is the quadratic filter. In step 621, the quadratic filter calculates the first threshold value Th1 for classifying each pixel of the character block as a character or background pixel. The first threshold value Th1 can be calculated using Equation (4). In step 623, the mean computation part 313 classifies pixels of the character block into character and background pixels on the basis of the first threshold value Th1, and calculates mean brightness values for the character and background pixels for a character block, in accordance with Equation (5) and Equation (6). In step 625, the normalization part 315 normalizes the pixels of the character block x(m, n) using the mean brightness value $\mu_0$ for the character pixels and the mean brightness value $\mu_1$ for the background pixels output from the mean computation part 313 so that the character pixels have values close to a '1' while the background pixels have values close to '0'. The normalization part 315 normalizes the pixels of the character block x(m, n) in accordance with Equation (7).

Figure 19F:
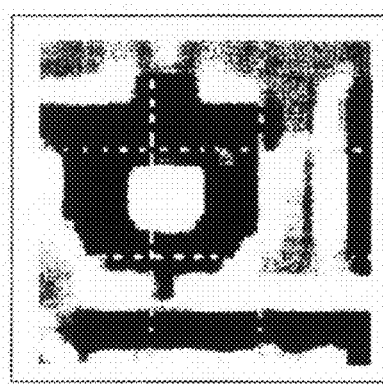

In step 627, the normalized character block $x_N(m, n)$ is subject to a quadratic operation in the quadratic operation part 317, so that edges of the character block are enhanced and their noise components are reduced. The quadratic operation part 317 performs the calculation of Equation (8). In step 629, the denormalization part 319 denormalizes the quadratic-processed character block $y_N(m, n)$ and generates an output block y(m, n). The denormalization part 319 performs the function of converting pixels of the character block normalized by the normalization part 315 in the range of a brightness value before normalization in accordance with Equation (9). An image output from the denormalization part 319 is shown in FIG. 19F, and the character block y(m, n) is applied to the block splitting part 180 and the second threshold selection part 321. In step 631, the second threshold selection part 321 generates a second threshold Th2 for binarizing pixels of the character block into character pixels and background pixels in the binarization part 140, and the second threshold Th2 becomes the threshold BTH of the binarization part 140.

Figure 19G:
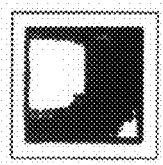
Figure 19H:
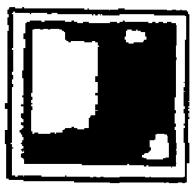

In step 633, the block splitting part 180 receives the edge-enhanced grouped block of FIG. 19F output from the quadratic filter, and separates the character block of FIG. 19G from the grouped block. The block splitting part 180 performs the function of separating-only the character block located at the center of the grouped block from the grouped block. In step 635, the binarization part 140 compares pixels of the separated character block of FIG. 19G with the threshold $BTH_N$, and binarizes the pixels into character and background pixels having the first and second brightness values as shown in FIG. 19H. Pixels of the background block output from the block classification part 120 or the block growing part 160 are binarized into the second brightness value.

Figure 19I:
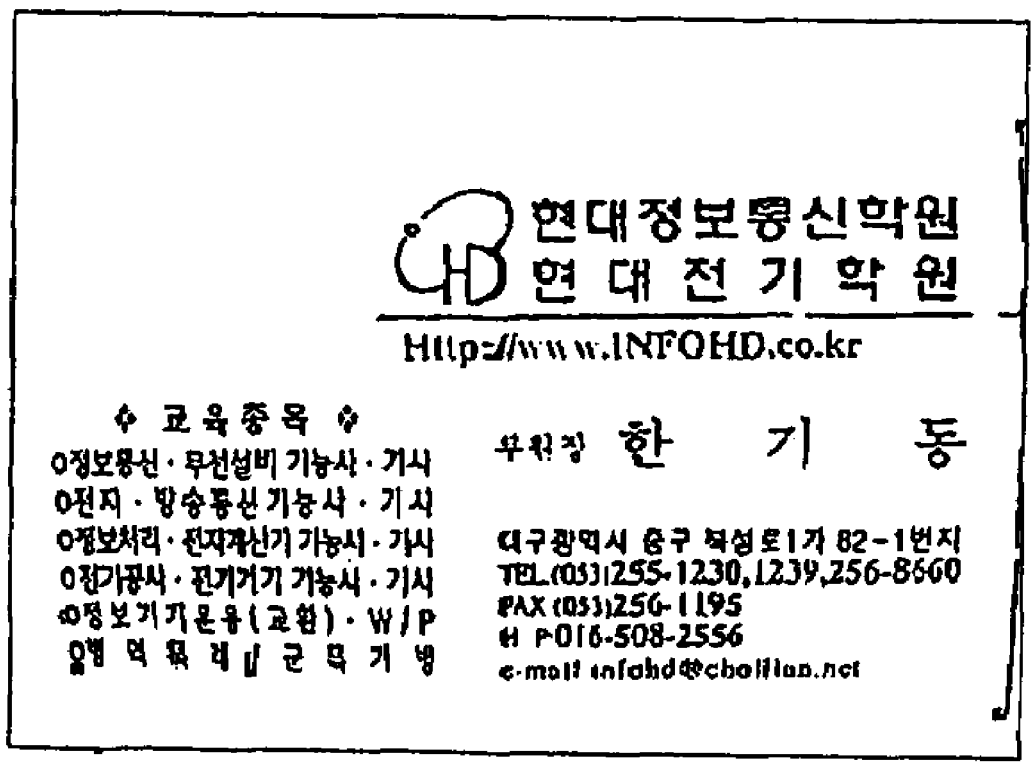

Through repetition of the above operation, the character blocks and the background blocks are binarized, and if it is determined in step 637 that the binarization is completed for all blocks of the image, a binarized image as represented by FIG. 19I is output in step 639 ("Yes" path from decision step 637).

Figure 20:
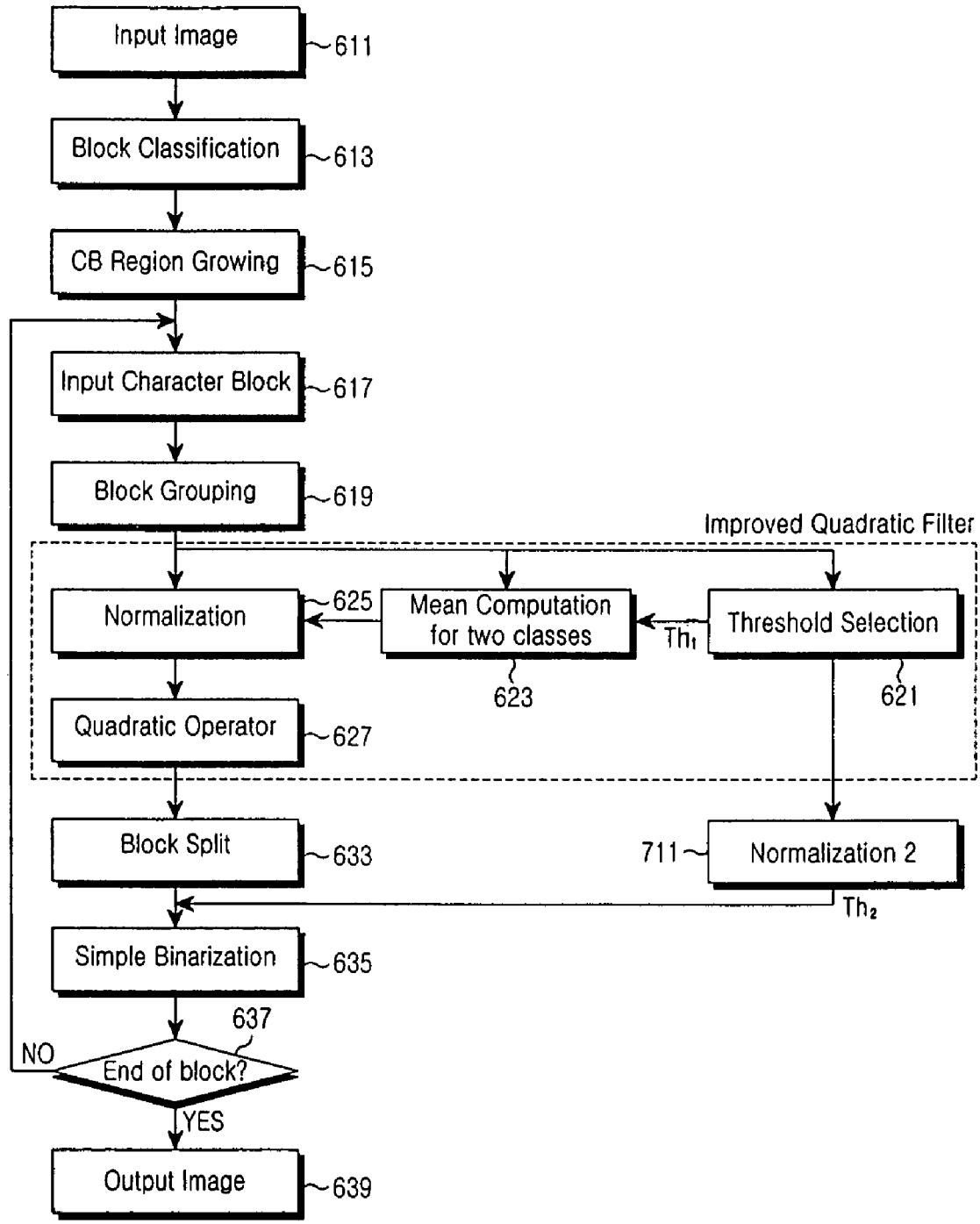
FIG. 20 is a flowchart illustrating an example of an image binarization method where the improved quadratic filter is used in accordance with an embodiment of the present invention.

FIG. 20 is a flowchart illustrating an example of a binarization method in which the edge enhancement part 130 is implemented using the improved quadratic filter in accordance with an embodiment of the present invention. FIG. 20 shows a binarization method according to the fourth embodiment in which the improved quadratic filter is used. FIGS. 21A to 21G are examples of images illustrating images generated when the binarization is performed in the procedure of FIG. 20.

Figure 21A:
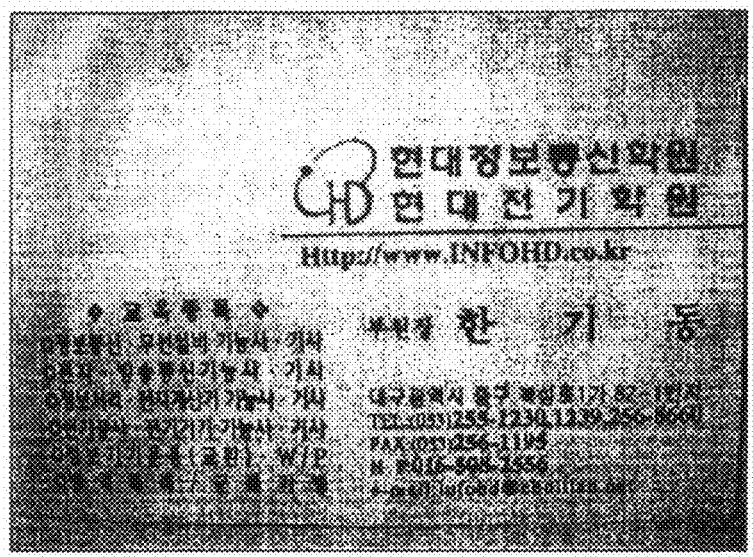
FIGS. 21A to 21G are examples of images illustrating images generated in each step of the binarization procedure of FIG. 20.
Figure 21B:
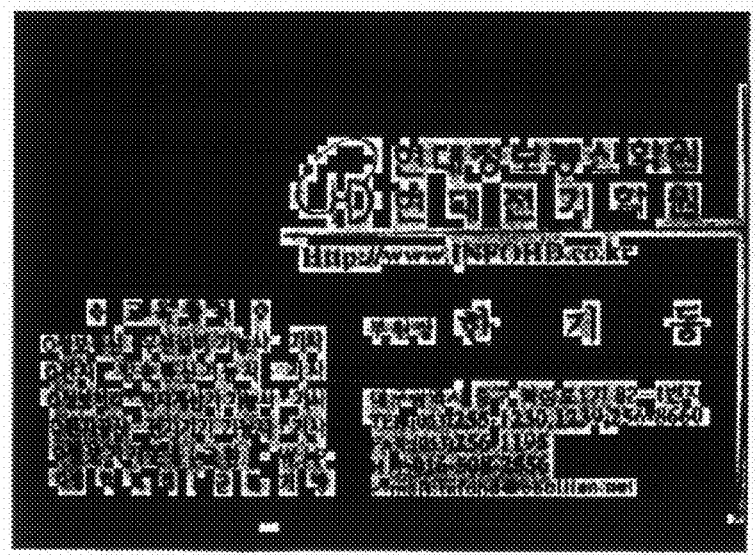

Referring to FIG. 20, in step 611, the input part 110 receives an input image shown in FIG. 21A. It is assumed that the image consists of 640 (columns)×480 (rows) pixels. In step 613, the block classification part 120 divides the input image represented by FIG. 21A received from the input part 110 into blocks, analyzes pixels of the divided blocks, and classifies the divided blocks into character blocks and background blocks. The input image is divided into 8×8-pixel blocks, and then classified into character blocks and background blocks as represented in FIG. 21B. In FIG. 21B, gray portions represent regions classified as character blocks, while black portions represent regions classified as background blocks.

Figure 21C:
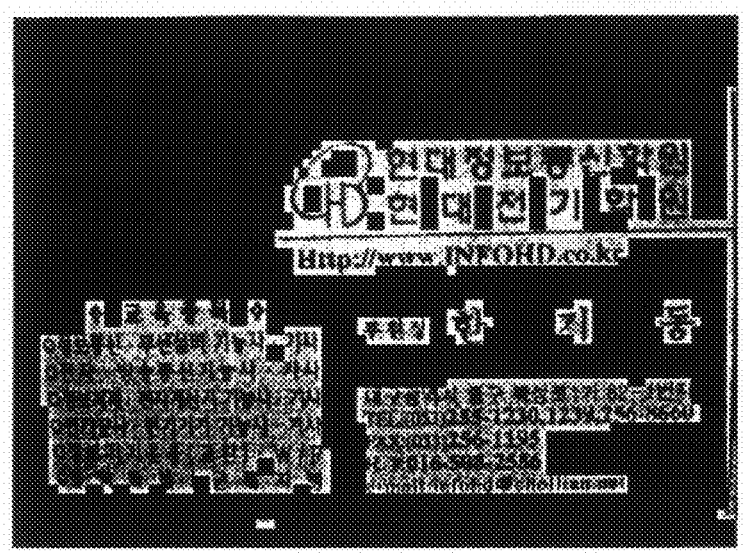
Figure 21D:

In step 615, the block growing part 160 extends the character blocks classified by the block classification part 120 as represented in FIG. 21C. In the block classification process, a block containing character pixels can be incorrectly classified as a background block due to the influence of a background between character pixels. The block growing part 160 grows the character blocks in order to extend pixels in a character block incorrectly classified as a background block. Then, in step 617, the block growing part 160 sequentially outputs the grown character blocks as represented in FIG. 21C to the block grouping part 170. The image output to the block grouping part 170 corresponds to the character blocks as represented in FIG. 21D. In step 619, the block grouping part 170 receives the character blocks as represented in FIG. 21D output from the block growing part 160, and groups each of the character blocks with its 8 adjacent blocks, generating the grouped blocks as represented by FIG. 21E.

Figure 21E:
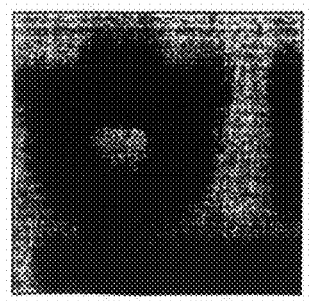

The grouped block image as represented by FIG. 21E is input into the edge enhancement part 130. The edge enhancement part 130 is the improved quadratic filter. In step 621, the improved quadratic filter calculates the first threshold value Th1 for classifying each pixel of the character block as a character or background pixel. The first threshold value Th1 can be calculated using Equation (4). In step 623, the mean computation part 313 classifies pixels of the character block into character and background pixels on the basis of the first threshold value Th1, and calculates mean brightness values for the character and background pixels for a character block, in accordance with Equation (5) and Equation (6). In step 625, the normalization part 315 normalizes the pixels of the character block x(m, n) using the mean brightness value $\mu_0$ for the character pixels and the mean brightness value $\mu_1$ for the background pixels output from the mean computation part 313 so that the character pixels have values close to a '1' while the background pixels have values close to '0'. The normalization part 315 normalizes the pixels of the character block x(m,n) in accordance with Equation (7).

In step 627, the normalized character block $x_N(m,n)$ is subject to a quadratic operation in the quadratic operation part 317, so that edges of the character block are enhanced and their noise components are reduced. The quadratic operation part 317 performs the calculation of Equation (8). In step 711, the threshold normalization part 331 normalizes the first threshold Th1 using a method equal to the normalization method of the normalization part 315. The threshold normalization part 331 normalizes the first threshold Th1 in accordance with Equation (10), to generate the second threshold Th2 (or the threshold $BTH_N$).

Figure 21F:
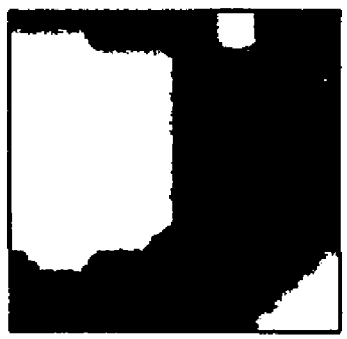

In step 633, the block splitting part 180 receives the grouped block output from the quadratic filter, and separates the character block from the grouped block. The block splitting part 180 performs the function of separating only a character block located at the center of the grouped block from the grouped block. In step 635, the binarization part 140 compares pixels of the character block separated by the block splitting part 180 with the threshold $BTH_N$, and binarizes the pixels into character and background pixels having the first and second brightness values as represented in FIG. 21F. Pixels of the background block output from the block classification part 120 or the block growing part 160 are binarized into the second brightness value.

Figure 21G:
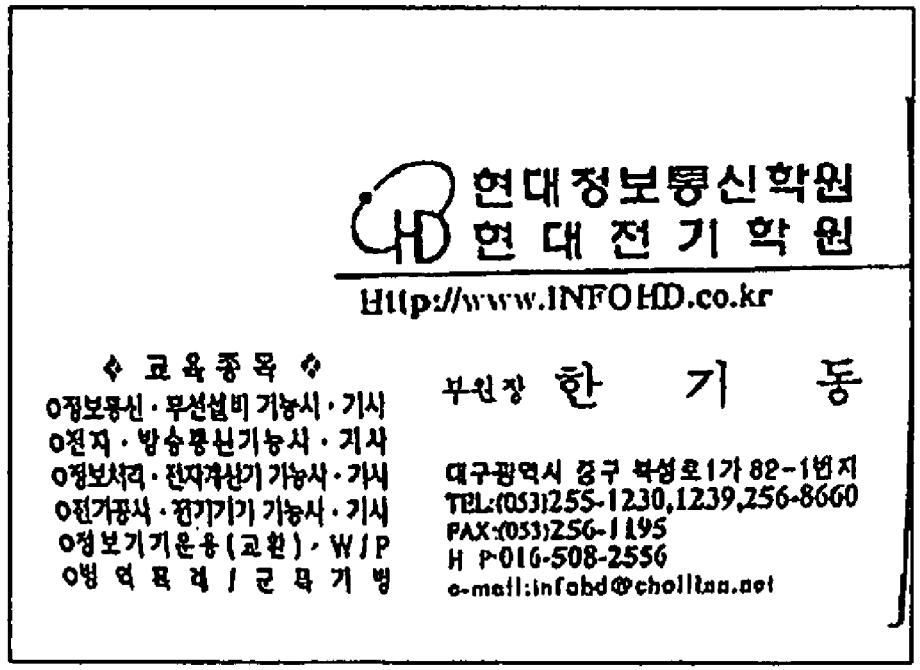

Through repetition of the above operation, the character blocks and the background blocks are binarized, and if it is determined in step 637 that the binarization is completed for all blocks of the image, a binarized image of FIG. 21G is output in step 639.

As described above, the new preprocessing operation for recognizing characters from an image includes dividing the image into blocks, classifying the divided blocks into character blocks and background blocks, performing a quadratic operation only on the character blocks, binarizing the quadratic-processed character blocks into character pixels and background pixels, and collectively binarizing all pixels of the background blocks into background pixels. Therefore, even when the binarization is performed on an image photographed in an irregularly lighted situation, with a shadow thrown thereon, its binarization performance can be improved. In addition, a block containing a character pixel, incorrectly classified as a background block, is reclassified as a character block, improving reliability of block classification. Moreover, it is possible to improve reliability of binarization on character blocks by grouping a character block with its neighboring blocks, performing a quadratic operation on the grouped block, and separating the character block from the grouped block in a binarization process.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for binarizing an image, comprising:
   an input part for receiving an image;
   a block classification part for dividing the received image into blocks, and classifying the divided blocks into character blocks and background blocks;
   an edge enhancement part for enhancing edges of each character block classified by the block classification part, using relations between neighboring pixels in the character block classified by the block classification part, and generating a threshold for distinguishing character pixels and background pixels of the character block; and
   a binarization part for binarizing pixels of character blocks output from the edge enhancement part into a first brightness value for character pixels and a second brightness value for background pixels by comparing the pixels of the character blocks with the threshold, and binarizing pixels of background blocks output from the block classification part into the second brightness value.

2. The device of claim 1, wherein the edge enhancement part comprises:
   a first threshold selection part for calculating a first threshold for classifying each pixel of the character block as a character pixel or a background pixel;
   a mean computation part for classifying pixels of the character block into character pixels and background pixels on the basis of the first threshold, and calculating mean brightness values for character pixels and background pixels of the character block;
   a normalization part for normalizing the pixels of the character block using the mean brightness value for character pixels and the mean brightness value for background pixels output from the mean computation part so that the character pixels have a value close to '1' while the background pixels have a value close to '0';
   a quadratic operation part for performing a quadratic operation on the normalized character block to enhance edges of the character block and reduce noise of the character block;
   a denormalization part for denormalizing the quadratic-processed character block and providing the denormalized character block to the binarization part; and
   a second threshold selection part for calculating a second threshold for classifying each pixel of the denormalized character block as a character pixel or a background pixel, and outputting the second threshold as a threshold for the binarization part.

3. The device of claim 2, wherein the edge enhancement part is a quadratic filter.

4. The device of claim 1, wherein the block classification part comprises:
   an image division part for dividing the received image into blocks having a predetermined size;
   a discrete cosine transform (DCT) conversion part for DCT-converting blocks output from the image division part;
   an energy calculation part for calculating a sum of absolute values of dominant DCT coefficients within each of the DCT-converted blocks, and outputting the calculated sum as an energy value of the corresponding block;
   a threshold calculation part for summing up the energy values calculated for respective blocks by the energy calculation part, and generating a threshold by dividing the summed energy value by the total number of blocks; and
   a classification part for sequentially receiving the energy values for the respective blocks from the energy calculation part, and classifying corresponding blocks as character blocks or background blocks by comparing the received energy values with the threshold.

5. The device of claim 4, wherein each of the blocks has a size of 8×8 pixels, and an energy value of each block is calculated by an equation:

$$S^k = \sum_{i=1}^{9} |D_i^k|$$

where $|D_i^k|$ denotes an $i^{th}$ dominant DCT coefficient of a $k^{th}$ block, and $S^k$ denotes a sum of absolute values of dominant DCT coefficients in the $k^{th}$ block.

6. The device of claim 1, wherein the edge enhancement part comprises:
- a first threshold selection part for calculating a first threshold for classifying each pixel of the character block as a character pixel or a background pixel;
- a mean computation part for classifying pixels of the character block into character pixels and background pixels on the basis of the first threshold, and calculating mean brightness values for character pixels and background pixels of the character block;
- a normalization part for normalizing pixels of the character block using the mean brightness value for character pixels and the mean brightness value for background pixels output from the mean computation part so that the character pixels have a value close to '1' while the background pixels have a value close to '0';
- a quadratic operation part for performing a quadratic operation on the normalized character block so as to enhance edges of the character block and reduce noise of the character block; and
- a second threshold selection part for calculating a second threshold for classifying pixels into character pixels and background pixels, by normalizing the first threshold, and outputting the second threshold as a threshold for the binarization part.

7. A device for binarizing an image, comprising:
- an input part for receiving an image;
- a block classification part for dividing the received image into blocks, and classifying the divided blocks into character blocks and background blocks;
- a block growing part for growing the classified character blocks, and restoring a block containing a character pixel, classified as a background block, to a character block;
- an edge enhancement part for enhancing edges of each character block classified by the block classification part and each character block restored by the block growing part, using relations between neighboring pixels in the character block output from the block growing part, and generating a threshold for distinguishing character pixels and background pixels of the character block; and
- a binarization part for binarizing pixels of character blocks output from the edge enhancement part into a first brightness value for character pixels and a second brightness value for background pixels by comparing the pixels of the character blocks with the threshold, and binarizing pixels of background blocks output from the block growing part into the second brightness value.

8. The device of claim 7, wherein the block growing part comprises:
- a dilation part for growing a character block and changing a block containing a character pixel, classified as a background block, to a character block; and
- a closing part for eroding the dilated character block and deducting connected blocks.

9. A device for binarizing an image, comprising:
- an input part for receiving an image;
- a block classification part for dividing the received image into blocks, and classifying the divided blocks into character blocks and background blocks;
- a block grouping part for grouping a character block classified by the block classification part with its neighboring blocks, thereby generating a grouped block;
- an edge enhancement part for enhancing edges of each character block classified by the block classification part, using relations between neighboring pixels in the grouped block, and generating a threshold for distinguishing character pixels and background pixels of the character block;
- a block splitting part for separating the character block from the grouped block output from the edge enhancement part; and
- a binarization part for binarizing pixels of the separated character block into a first brightness value for character pixels and a second brightness value for background pixels by comparing the pixels of the separated character block with the threshold, and binarizing pixels of the background block output from the block classification part into the second brightness value.

10. A device for binarizing an image, comprising:
- an input part for receiving an image;
- a block classification part for dividing the received image into blocks, and classifying the divided blocks into character blocks and background blocks;
- a block growing part for growing the classified character block, and restoring a block containing a character pixel, classified as a background block, to a character block;
- a block grouping part for grouping a character block output from the block growing part with its neighboring blocks, thereby generating a grouped block;
- an edge enhancement part for enhancing edges of each character block classified by the block classification part and each character block restored by the block growing part, using relations between pixels in the grouped block, and generating a threshold for distinguishing character pixels and background pixels of the character block;
- a block splitting part for separating the character block from the grouped block output from the edge enhancement part; and
- a binarization part for binarizing pixels of the separated character blocks into a first brightness value for character pixels and a second brightness value for background pixels by comparing the pixels of the separated character blocks with the threshold, and binarizing pixels of a background block output from the block growing part into the second brightness value.

11. A method for binarizing an image, comprising the steps of:
- receiving an image;
- dividing the received image into blocks, and classifying the divided blocks into character blocks and background blocks;
- enhancing edges of each character block classified by the block classification step, using relations between neighboring pixels in the character block, and generating a threshold for distinguishing character pixels and background pixels of the character block; and
- binarizing pixels of the edge-enhanced character blocks into a first brightness value for character pixels and a second brightness value for background pixels by comparing the pixels of the character blocks with the threshold, and binarizing pixels of the classified background blocks into the second brightness value.

12. The method of claim 11, wherein the edge enhancement step comprises the steps of:
calculating a first threshold for classifying each pixel of the character block as a character pixel or a background pixel;
classifying pixels of the character block into character pixels and background pixels on the basis of the first threshold, and calculating mean brightness values for character pixels and background pixels of the character block;
normalizing the pixels of the character block using the mean brightness value for character pixels and the mean brightness value for background pixels so that the character pixels have a value close to '1' while the background pixels have a value close to '0';
performing a quadratic operation on the normalized character block to enhance edges of the character block and reduce noises of the character block;
denormalizing the quadratic-processed character block so that the denormalized character block can be processed in a binarization step; and
calculating a second threshold for classifying each pixel of the denormalized character block as a character pixel or a background pixel, and outputting the second threshold as a threshold for the binarization step.

13. The method of claim 12, wherein the edge enhancement is performed by a quadratic filter.

14. The method of claim 11, wherein the block classification step comprises the step of:
dividing the received image into blocks having a predetermined size;
discrete cosine transform (DCT)-converting the divided blocks;
calculating a sum of absolute values of dominant DCT coefficients within each of the DCT-converted blocks, and outputting the calculated sum as an energy value of the corresponding block;
summing up the energy values calculated for respective blocks, and generating a threshold by dividing the summed energy value by the total number of blocks; and
sequentially receiving the energy values for the respective blocks, and classifying corresponding blocks as character blocks or background blocks by comparing the received energy values with the threshold.

15. The method of claim 14, wherein each of the blocks has a size of 8×8 pixels, and an energy value of each block is calculated by an equation:

$$S^k = \sum_{i=1}^{9} |D_i^k|$$

where $|D_i^k|$ denotes an $i^{th}$ dominant DCT coefficient of a $k^{th}$ block, and $S^k$ denotes a sum of absolute values of dominant DCT coefficients in the $k^{th}$ block.

16. The method of claim 11, wherein the edge enhancement step comprises the steps of:
calculating a first threshold for classifying each pixel of the character block as a character pixel or a background pixel;
classifying pixels of the character block into character pixels and background pixels on the basis of the first threshold, and calculating mean brightness values for character pixels and background pixels of the character block;
normalizing pixels of the character block using the mean brightness value for character pixels and the mean brightness value for background pixels so that the character pixels have a value close to '1' while the background pixels have a value close to '0';
performing a quadratic operation on the normalized character block so as to enhance edges of the character block and reduce noise of the character block; and
calculating a second threshold for classifying pixels into character pixels and background pixels, by normalizing the first threshold, and outputting the second threshold as a threshold for the binarization step.

17. A method for binarizing an image, comprising the steps of:
receiving an image;
dividing the received image into blocks, and classifying the divided blocks into character blocks and background blocks;
growing the classified character blocks, and restoring a block containing a character pixel, classified as a background block, to a character block;
enhancing edges of each character block classified by the block classification step and each character block restored by the block restoration step, using relations between neighboring pixels in the character block, and generating a threshold for distinguishing character pixels and background pixels of the character block; and
binarizing pixels of the edge-enhanced character blocks into a first brightness value for character pixels and a second brightness value for background pixels by comparing the pixels of the character blocks with the threshold, and binarizing pixels of the background blocks into the second brightness value.

18. The method of claim 17, wherein the block growing step comprises the steps of:
growing a character block and changing a block containing a character pixel, classified as a background block, to a character block; and
eroding the dilated character block and deducting connected blocks.

19. A method for binarizing an image, comprising the steps of:
receiving an image;
dividing the received image into blocks, and classifying the divided blocks into character blocks and background blocks;
grouping the classified character block with its neighboring blocks, thereby generating a grouped block;
enhancing edges of each character block classified by the block classification step, using relations between neighboring pixels in the grouped block, and generating a threshold for distinguishing character pixels and background pixels of the character block;
separating the character block from the edge-enhanced grouped block; and
binarizing pixels of the separated character block into a first brightness value for character pixels and a second brightness value for background pixels by comparing the pixels of the separated character block with the threshold, and binarizing pixels of the background block into the second brightness value.

20. A method for binarizing an image, comprising the steps of:
- receiving an image;
- dividing the received image into blocks, and classifying the divided blocks into character blocks and background blocks;
- growing the classified character block, and restoring a block containing a character pixel, classified as a background block, to a character block;
- grouping the character block with its neighboring blocks, thereby generating a grouped block;
- enhancing edges of each character block classified by the block classification step and each character block restored by the block restoration step, using relations between pixels in the grouped block, and generating a threshold for distinguishing character pixels and background pixels of the character block;
- separating the character block from the grouped block; and
- binarizing pixels of the separated character blocks into a first brightness value for character pixels and a second brightness value for background pixels by comparing the pixels of the separated character blocks with the threshold, and binarizing pixels of the background blocks into the second brightness value.

* * * * *